US 8,032,460 B2

(12) United States Patent
Takatori et al.

(10) Patent No.: US 8,032,460 B2
(45) Date of Patent: Oct. 4, 2011

(54) AUTHENTICATION MANAGING APPARATUS, AND SHOP COMMUNICATION TERMINAL

(75) Inventors: Sunao Takatori, Tokyo (JP); Hisanori Kiyomatsu, Tokyo (JP)

(73) Assignee: Daita Frontier Fund, LLC, Wilmington, DE (US)

( * ) Notice: Subject to any disclaimer, the term of this patent is extended or adjusted under 35 U.S.C. 154(b) by 2262 days.

(21) Appl. No.: 10/089,122

(22) PCT Filed: Jul. 19, 2001

(86) PCT No.: PCT/JP01/06299
§ 371 (c)(1),
(2), (4) Date: Mar. 22, 2002

(87) PCT Pub. No.: WO02/11004
PCT Pub. Date: Feb. 7, 2002

(65) Prior Publication Data
US 2002/0138423 A1    Sep. 26, 2002

(30) Foreign Application Priority Data

Jul. 27, 2000   (JP) ................................. 2000-226163

(51) Int. Cl.
*G06Q 40/00* (2006.01)
(52) U.S. Cl. ......... 705/44; 705/35; 705/36 R; 705/36 T; 705/37; 705/38; 705/39; 705/40; 705/41; 705/42
(58) Field of Classification Search .................... 355/61, 355/40, 55, 56, 59, 62, 63; 705/35, 36 R, 705/36 T, 37, 38, 39, 40, 41
See application file for complete search history.

(56) References Cited

U.S. PATENT DOCUMENTS

| 4,625,276 | A | * | 11/1986 | Benton et al. ................... 705/44 |
| 4,645,338 | A | * | 2/1987 | Juliana et al. ................. 356/150 |
| 4,876,568 | A | | 10/1989 | Ozawa et al. | |
| 5,608,778 | A | | 3/1997 | Partridge, III .................. 379/58 |

(Continued)

FOREIGN PATENT DOCUMENTS

JP    1-200344    8/1989

(Continued)

OTHER PUBLICATIONS

Abstract JP 64-017013.

(Continued)

*Primary Examiner* — Olabode Akintola
*Assistant Examiner* — Muriel Tinkler
(74) *Attorney, Agent, or Firm* — Sterne, Kessler, Goldstein & Fox P.L.L.C.

(57) ABSTRACT

A money receiving system receives monetary payments without using cash or placing restrictions on recipients of such payments. This system uses an authentication management apparatus and a store communication terminal. The authentication management apparatus includes a receiver for receiving customer ID information, store ID information, and monetary amount information from a store communication terminal, an authentication device for authenticating the customer ID and the store ID, and a transfer device for transferring money indicated by the monetary amount from an account of a store to an account of a customer. The store communication terminal includes a memory for storing store information, a receiver for receiving customer information, an input device for inputting a monetary amount that a store is to pay a customer, and a transmitter for transmitting the store ID, the customer ID, and the monetary amount to an authentication management apparatus.

15 Claims, 20 Drawing Sheets

U.S. PATENT DOCUMENTS

| | | | |
|---|---|---|---|
| 5,898,479 A * | 4/1999 | Hubbard et al. | 355/61 |
| 5,991,749 A * | 11/1999 | Morrill, Jr. | 705/44 |
| 6,012,048 A * | 1/2000 | Gustin et al. | 705/39 |
| 6,047,270 A * | 4/2000 | Joao et al. | 705/44 |
| 6,085,176 A * | 7/2000 | Woolston | 705/37 |
| 6,266,647 B1 * | 7/2001 | Fernandez | 705/14.14 |
| 6,393,411 B1 * | 5/2002 | Bishop et al. | 705/44 |
| 6,397,198 B1 * | 5/2002 | Hoffman et al. | 705/44 |
| 6,738,749 B1 * | 5/2004 | Chasko | 705/17 |
| 6,745,936 B1 * | 6/2004 | Movalli et al. | 235/379 |
| 6,963,843 B1 * | 11/2005 | Takatsu et al. | 705/1.1 |
| 6,999,943 B1 * | 2/2006 | Johnson et al. | 705/39 |
| 7,133,845 B1 | 11/2006 | Ginter et al. | |
| 7,165,174 B1 * | 1/2007 | Ginter et al. | 713/153 |
| 7,478,065 B1 * | 1/2009 | Ritter et al. | 705/39 |
| 2002/0059147 A1 * | 5/2002 | Ogasawara | 705/70 |
| 2008/0040276 A1 * | 2/2008 | Hammad et al. | 705/44 |

FOREIGN PATENT DOCUMENTS

| | | |
|---|---|---|
| WO | WO 92/11598 A1 | 7/1992 |
| WO | WO 9211595 A1 * | 7/1992 |
| WO | WO 2007/083319 A2 | 7/2007 |
| WO | WO 2007083319 A2 * | 7/2007 |

OTHER PUBLICATIONS

International Search Report by the Japanese Patent Office for International Patent Appliation PCT/JP01/06299, issued Oct. 16, 2001.

* cited by examiner

US 8,032,460 B2

AUTHENTICATION MANAGING APPARATUS, AND SHOP COMMUNICATION TERMINAL

CROSS REFERENCE TO RELATED APPLICATIONS

This application is a National Stage Entry of PCT Application No. PCT/JP01/06299 filed Jul. 19, 2001, which claims priority to Japanese Application No. 2000-226163 filed Jul. 27, 2000.

TECHNICAL FIELD

The present invention relates to an authentication management apparatus and a store communication terminal that are used in a money receiving system which enables users to receive monetary payments without using cash.

BACKGROUND ART

There is always the risk of theft at places where money changes hands. While cashless systems for monetary payments such as credit cards are widely used, sufficient research has not been performed to the receipt of monetary payments.

As one example, robberies at the prize-exchanging booths provided at pachinko parlors in Japan occurs often. However, with conventional cashless technologies there is no easy way for pachinko players to be given their winnings without using cash. To become the recipient of a monetary payment made using a credit card service, a pachinko player must pass a strict checking procedure, which makes it impossible for all players to become recognized recipients of payments. A recipient of a transfer made using a credit card system also needs equipment to verify the ID of the payer, which naturally limits the number of potential recipients in such a system.

The present invention was conceived in view of the situation described above and has an object to provide a money receiving system that allows monetary receipts to be made without using cash and without placing restrictions on the recipients of payments, and also an authentication management apparatus and a store communication terminal that are used in such a money receiving system.

DISCLOSURE OF THE INVENTION

An authentication management apparatus of the present invention includes storage means for storing a plurality of pieces of customer ID information and a plurality of pieces of store ID information, reception means for receiving a piece of customer ID information, a piece of store ID information, and amount information indicating a monetary amount from a store communication terminal, authentication means for authenticating the piece of customer ID information and the piece of store ID information that have been received by the reception means, and transfer means for transferring the monetary amount indicated by the amount information from an account of a store with the authenticated piece of store ID information to an account of a customer with the authenticated piece of customer ID information.

A store communication terminal of the present invention includes storage means for storing store ID information, reception means for receiving customer ID information, input means for inputting amount information for a monetary amount that a store is to pay a customer, and transmission means for transmitting the store ID information stored in the storage means, the customer ID information received by the reception means, and the amount information inputted by the input means to an authentication management apparatus that authenticates the store ID information and the customer ID information.

By constructing a money receiving system that uses the present authentication management apparatus and store communication terminal, a payment process that does not use cash can be performed for a monetary amount so long as a first user has an account at a financial institution or the like. This payment is performed based on ID information that is stored in the store communication terminal. Such system is highly secure and can prevent theft. As the person making the payment has the initiative over the operation for making the payment, payers who become used to operating the system can develop a strong sense of trust in the operation of the system.

In the store communication terminal of the present invention, the input means may input transfer source store account information and the transmission means may transmit the transfer source store account information inputted by the input means. Also, in the authentication management apparatus of the present invention, the reception means may receive transfer source store account information and the transfer means may transfer the monetary amount from an account indicated by the transfer source store account information received by the reception means.

In the authentication management apparatus of the present invention, the reception means may receive cancel information from the store communication terminal and stop the transfer means from transferring the monetary amount.

By constructing a money receiving system using the authentication management apparatus and the store communication terminal, payments from a transfer source account to a customer account and the cancellation of such payments can be performed within a system.

With the present invention, when a first user has transmitted ID information for the first user and a second user and information indicating a monetary amount to an authentication management apparatus operated by an authentication manager, the transmitted content may also be transmitted to a customer communication terminal so that the second user can check the transmitted content.

With the present invention, after checking the transmitted content, the second user may communicate with the authentication management apparatus so as to cancel the transmitted content.

With the present invention, the store communication terminal and/or customer communication terminal may be a mobile communication terminal.

As one example for the present invention, the first user may be a pawnshop and the second user may be the customer of a pawnshop. In a second example, the first user may be a money-exchanging booth for an instant lottery and the second user may be a winner in the instant lottery. In a third example, the first user may be a prize-exchanging booth at a pachinko parlor and the second user may be a pachinko player. In a fourth example, the first user may be a taxi passenger and the second user may be a taxi firm. In a fifth example, the first user may be a customer of a food stall and the second user may be a food stall. In a sixth example, the first user may be someone who wishes to make an offering to a priest and the second user may be the priest. Finally, in a seventh example, the first user may be a customer and the second user may be a bill collector.

With the present invention, if an instant lottery ticket and a customer communication terminal can be inserted into a store communication terminal and the store communication terminal can automatically obtain the winnings for the instant lottery ticket and ID information for the first user, it is possible for the store communication terminal to be operated as an unmanned machine.

With the present invention, the first user may provide the second user with an indication of the monetary amount to be received.

With the present invention, the second user may also act as the authentication manager.

With the present invention, the first user may indicate an account from which the money is to be transferred.

With the present invention, the store communication terminal and the customer communication terminal may communicate with one another via the Internet.

The present application is based on Japanese Patent Application No. 2000-226163, the contents of which are hereby incorporated by reference.

BEST MODE FOR CARRYING OUT THE PRESENT INVENTION

First Embodiment

The following describes a first embodiment of a money receiving system that relates to an authentication management apparatus and a store communication terminal of the present invention, with reference to the attached drawings.

Figure 1:
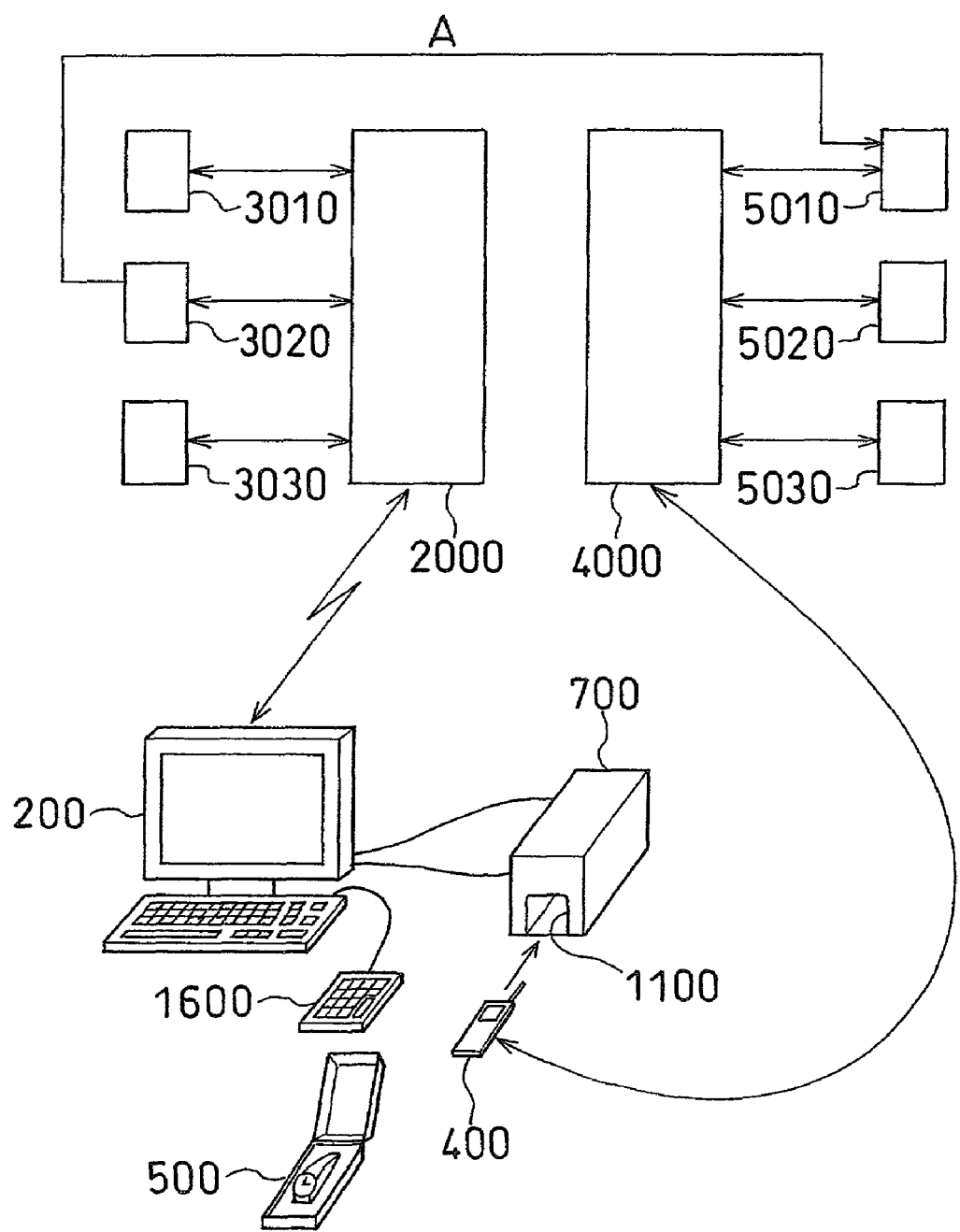
FIG. 1 is a block diagram showing a first embodiment of a money receiving system that relates to an authentication management apparatus and a store communication terminal of the present invention.
Figure 2:
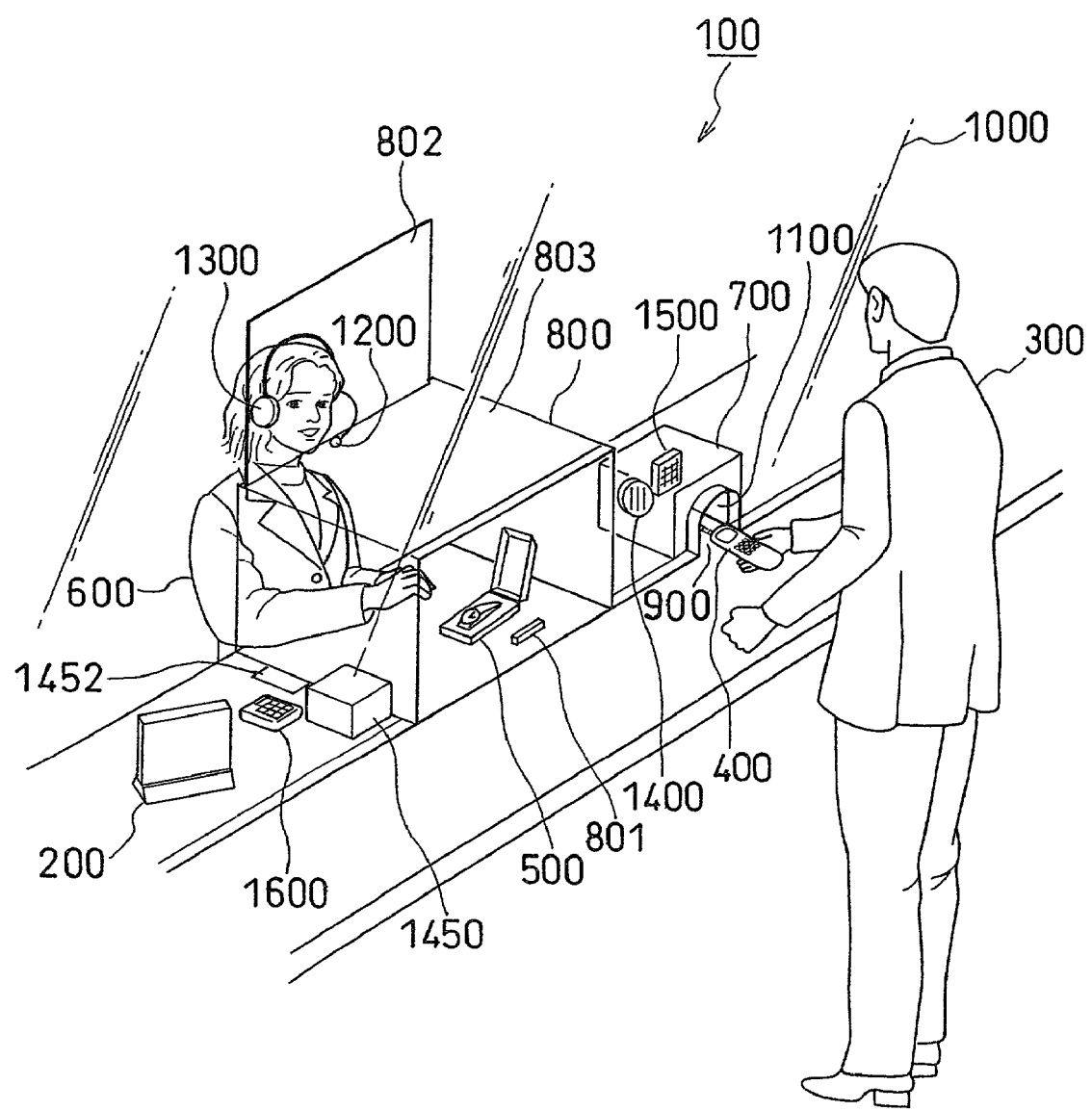
FIG. 2 is a perspective drawing of the first embodiment.
Figure 3:
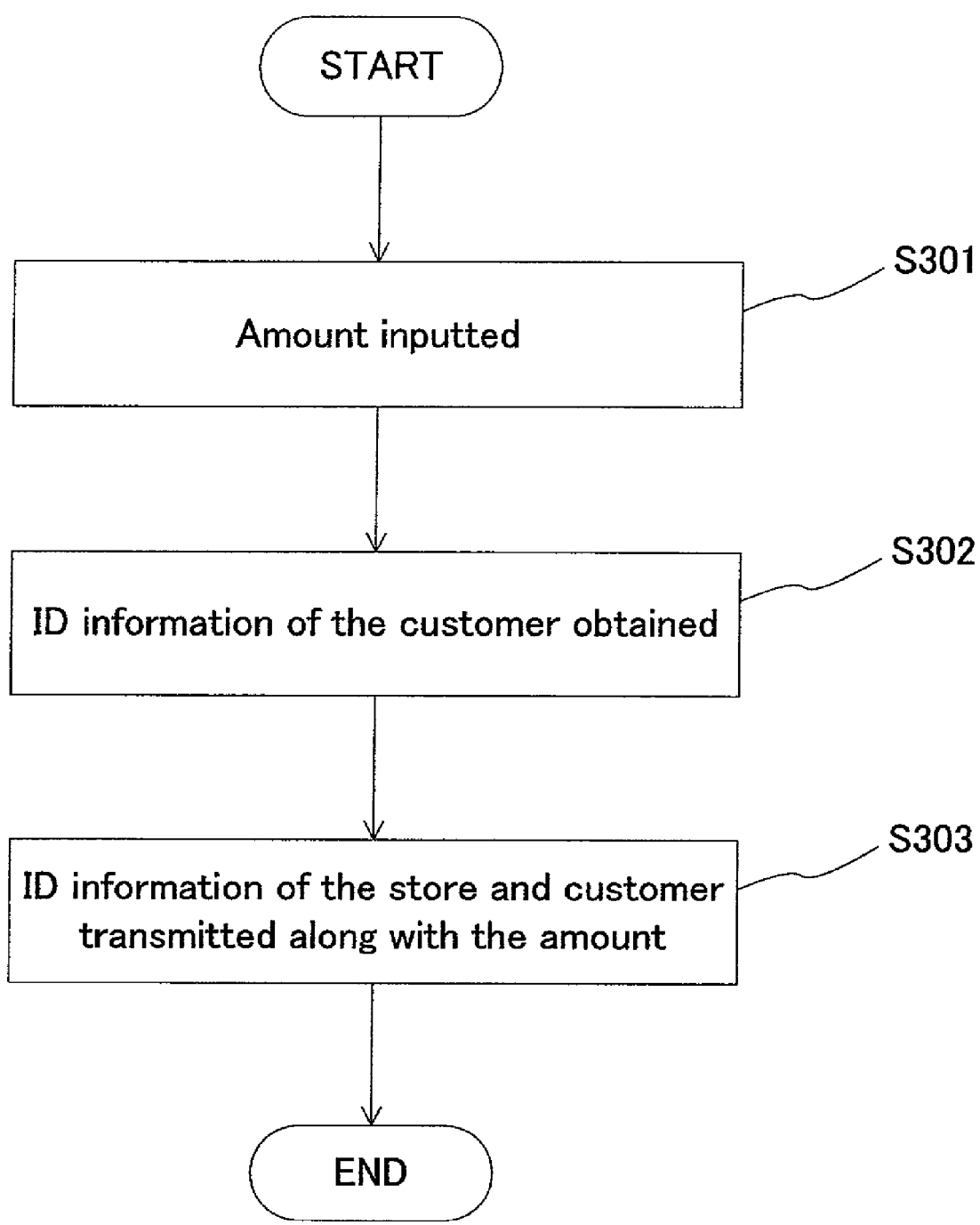
FIG. 3 is a flowchart showing the processing performed in the first embodiment.

FIG. 1 is a block diagram showing a money receiving system for use in a pawnshop. FIG. 2 is a perspective drawing of the pawnshop, and FIG. 3 is a flowchart showing the processing performed by the money receiving system.

The present money receiving system includes a store communication terminal 200 that is owned by a pawnshop 100 and a customer communication terminal (mobile communication terminal) 400 that is owned by a customer 300. The customer 300 hands over an item 500 that he wishes to pawn to a clerk 600 of the pawnshop 100 and inserts the customer communication terminal 400 into an authentication apparatus 700 that is connected to the store communication terminal 200.

The pawnshop 100 is equipped with a transparent barrier wall 1000 with a double-entry door apparatus 800, which allows the item 500 to be handed over without affecting the safety of the clerk 600, and an opening 900 that allows the customer communication terminal 400 to be inserted. The double-entry door apparatus 800 has a tunnel 803 that connects a customer-side door 801 and a clerk-side door 802. The clerk-side door 802 cannot be opened until the customer-side door 801 has been closed, and the customer-side door 801 cannot be opened when the clerk-side door 802 is open. As a result, the clerk 600 can be protected from the customer 300 during the handing over of the item 500. The authentication apparatus 700 also has a tunnel 1100 that is connected to the opening 900 and covers the periphery of the opening 900.

The clerk 600 is provided with a microphone 1200 and an earphone 1300. On the outside of the transparent barrier wall 1000, a speaker 1400 for outputting sound inputted via the microphone 1200 and a microphone 1500 for inputting the sound outputted by the earphone 1300 are provided. As a result, the transparent barrier wall 1000 can be used to completely seal off the outside, thereby protecting the security of the pawnshop 100.

The authentication apparatus 700 communicates with the customer communication terminal 400 that has been inserted into the tunnel 1100 and obtains ID information relating to the customer 300. The customer communication terminal 400 is equipped with storage means (not shown in the drawings) such as a memory, with the ID information being stored in this storage means.

The store communication terminal 200 is equipped with storage means, reception means, input means, and transmission means. The storage means stores store ID information. The reception means receives customer ID information from the authentication apparatus 700. The input means is composed of a ten-key pad or the like, and is used to input information such as amount information for the amount to be paid by the store to the customer and transfer source store account information. The transmission means transmits information, such as the store ID information stored in the storage means, customer ID information received by the reception means, money information or transfer source store account information inputted via the input means, to an authentication management apparatus.

The authentication apparatus 700 transmits the customer ID information to the store communication terminal 200. This customer ID information is received by the reception means of the store communication terminal 200.

The clerk 600 judges the value of the item 500 and informs the customer 300. When the customer 300 agrees with the evaluation, the clerk 600 inputs the amount to be paid using a ten-key pad 1600 (the input means). At this point, the store communication terminal 200 outputs a receipt 1452 using a card printer 1450.

The store communication terminal 200 transmits ID information for this store communication terminal 200, ID information for the customer 300, and information showing the amount to be paid to the customer 300 to an authentication management apparatus 2000 operated by an authentication manager. The authentication manager is a financial institution, a credit service, or an authentication service firm entrusted by a plurality of financial institutions 3010, 3020, and 3030 or the like.

The authentication management apparatus 2000 is equipped with storage means, reception means, authentication means, and transfer means. The storage means stores a plurality of pieces of customer ID information and a plurality of pieces of store ID information. The reception means receives information such as customer ID information, store ID information, amount information, and transfer source store account information from a store communication terminal 200. The authentication means authenticates the customer ID information and store ID information which are received by the reception means. The transfer means transfers the monetary amount shown by the amount information from an account of the store with store ID information that has been authenticated by the authentication means to the account of the customer with the customer ID information.

The authentication management apparatus 2000 communicates with an authentication management apparatus 4000 of an authentication manager that manages the ID information of the customer 300, and so obtains information for an account at a financial institution 5010 into which the monetary amount is to be transferred. The authentication management apparatus 2000 also obtains, via the reception means, customer ID information, store ID information, amount information, and transfer source store account information from a store communication terminal. Using the authentication means, the authentication management apparatus 2000 authenticates the obtained customer ID information and store ID information. The reception means also receives transfer source store account information from the store communication terminal 200. The authentication management apparatus 2000 sends, using the transfer means, an instruction to a predetermined financial institution 3020 for the pawnshop 100 for the payment of an amount into an account in the financial institution 5010. As shown by the arrow A, a transfer is made from the financial institution 3020 to the financial institution 5010. Note that if the reception means receives cancel information from the store communication terminal 200, this transfer by the transfer means is cancelled.

In the flowchart in FIG. 3, the clerk 600 inputs a monetary amount via the ten-key pad 1600 (step S301). The store communication terminal 200 obtains ID information of the customer 300 (step S302), and transmits it with ID information for the store and an indication of the amount to the authentication management apparatus 2000 (step S303). After this, the procedure for transferring the amount is executed as described above.

If, as described above, the customer 300 has an account at the financial institution 5010, for example, a money transfer procedure can be executed based on ID information stored in the customer communication terminal 400, thereby enabling the transaction between the pawnshop 100 and the customer 300 to be performed without cash. Since there is no cash that can be stolen, this prevents theft and increases the security of the store. Since the person making the payment has the initiative over the operation and can first value the item 500, payers who become used to operating the system can develop a strong sense of trust in its operation.

The transmission means of the store communication terminal 200 may also send various information, such as the store ID information, the customer ID information, the amount information, and the transfer source store account information to the customer communication terminal 400 to enable the customer to verify this information on the customer communication terminal 400.

Second Embodiment

Figure 4:
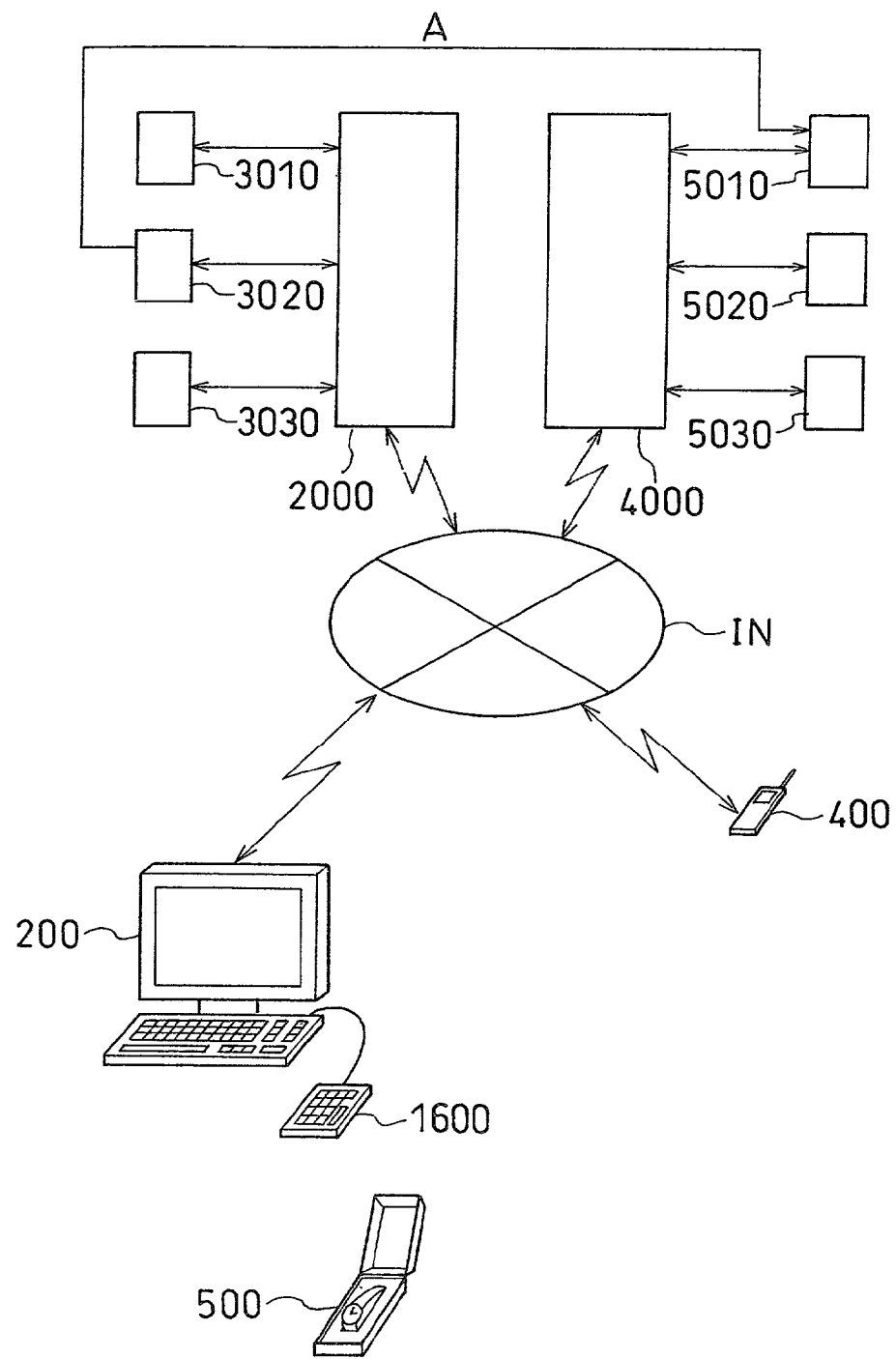
FIG. 4 is a block diagram showing a second embodiment of the present invention.

FIG. 4 is a block diagram showing a second embodiment of the present invention in which the communication system used in the first embodiment has been modified. In this second embodiment, the store communication terminal 200, the customer communication terminal 400, the authentication management apparatus 2000, and the authentication management apparatus 4000 are assumed to be able to communicate with each other via the Internet IN. The construction and functioning of the store communication terminal 200 and the authentication management apparatus 2000 are the same as in the first embodiment. By using this construction, the same effects as the first embodiment can be achieved.

Third Embodiment

Figure 5:
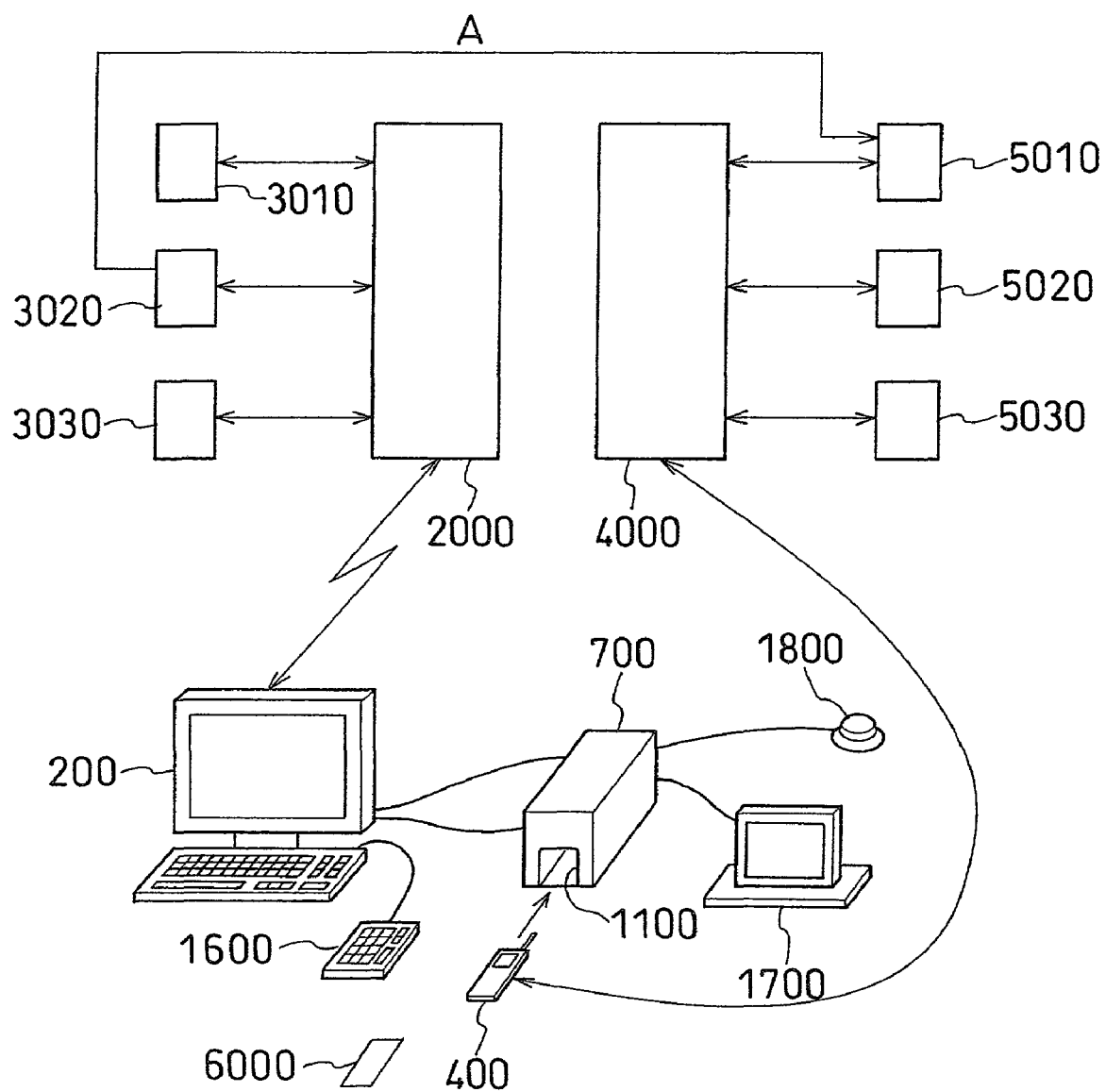
FIG. 5 is a block diagram showing a third embodiment of the present invention.
Figure 6:
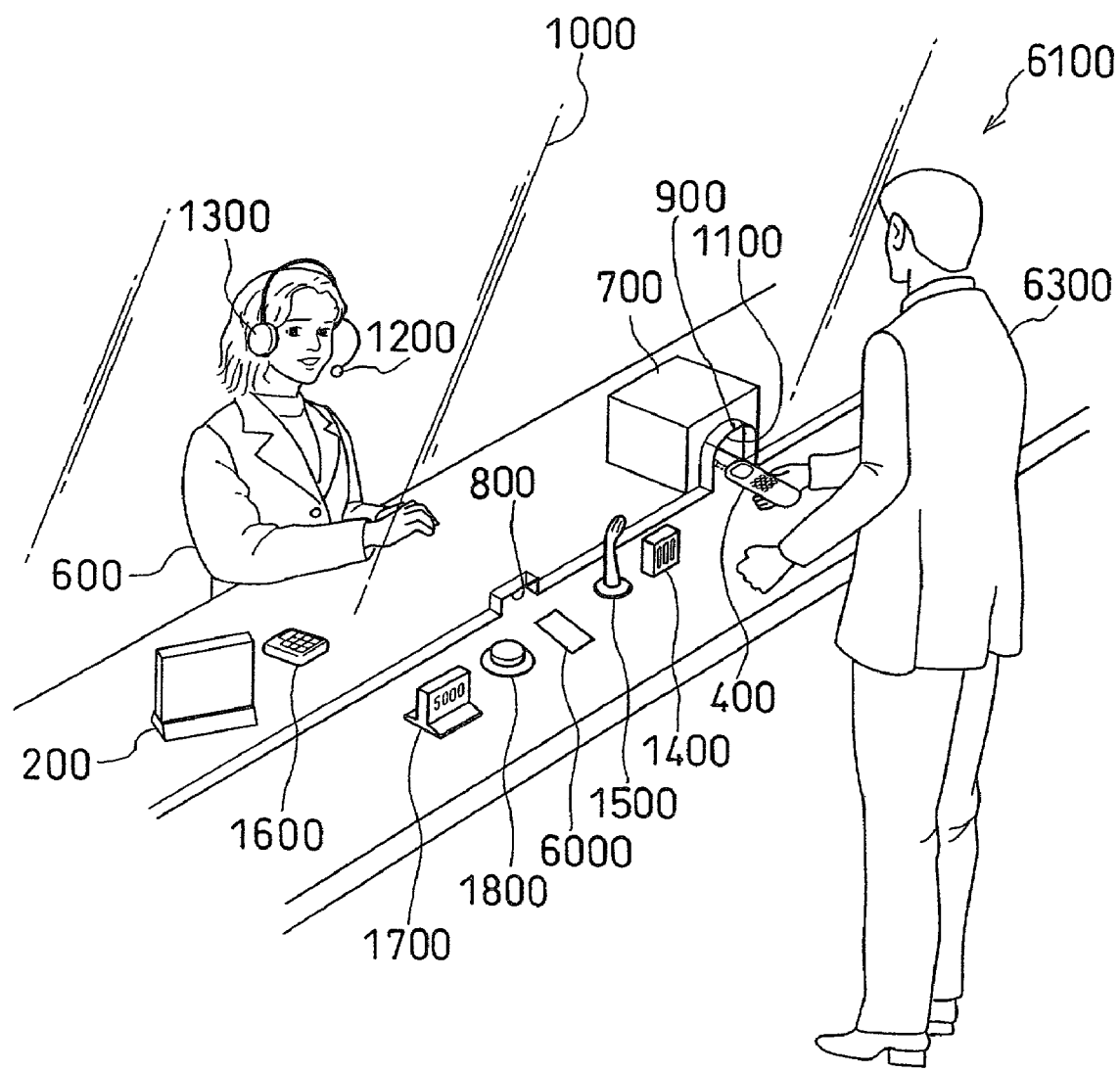
FIG. 6 is a perspective drawing of the third embodiment.

FIG. 5 is a block diagram showing a third embodiment of the present invention that is used in a money-exchanging booth 6100 for instant lottery tickets 6000. FIG. 6 is a perspective view of the money-exchanging booth 6100. In this third embodiment, elements that are the same as in the first embodiment have been given the same reference numerals and are assumed to be the same. This is also the case for the following embodiments.

The money receiving system is equipped with a store communication terminal 200 that is owned by the money-exchanging booth 6100 and a customer communication terminal (mobile communication terminal) 400 that is owned by a winner 6300 in an instant lottery. The construction and functioning of the store communication terminal 200 is the same as in the first embodiment described above. The winner 6300 hands over the winning instant lottery ticket 6000 to the clerk 600 at the money-exchanging booth 6100 as an indication to (prove) correspond to how much he has won. At the same time, the winner 6300 inserts his customer communication terminal 400 into the authentication apparatus 700 that is connected to the store communication terminal 200.

The money-exchanging booth 6100 is provided with a transparent barrier wall 1000 which has an opening 800 in which instant lottery tickets 6000 can be inserted and an opening 900 in which a customer communication terminal 400 can be inserted. The opening 800 is so small that only instant lottery tickets 6000 can pass through. The authentication apparatus 700 has a tunnel 1100 that is connected to the opening 900 and covers the periphery of the opening 900. The clerk 600 is provided with a microphone 1200 and an earphone 1300. On the outside of the transparent barrier wall 1000, a speaker 1400 for outputting sound inputted via the microphone 1200 and a microphone 1500 for inputting the sound outputted by the earphone 1300 are provided.

The authentication apparatus 700 communicates with the customer communication terminal 400 that has been inserted in the tunnel 1100 and obtains ID information for the winner 6300 of instant lottery.

The clerk 600 verifies the winning instant lottery ticket 6000 and inputs the amount to be paid to the winner 6300 via the ten-key pad 1600. This amount is displayed on a display 1700 provided on the outside of the transparent barrier wall 1000. When the winner 6300 of instant lottery presses a confirm button 1800, the winnings for the ticket are fixed at this amount.

In the same way as in the first embodiment, the store communication terminal 200 transmits ID information for the store communication terminal 200, ID information for the winner 6300, and an indication of the amount to be paid to the winner to the authentication management apparatus 2000, so that the appropriate amount is transferred into a predetermined account of the winner 6300. The construction and functioning of the authentication management apparatus 2000 are the same as in the first embodiment.

As a result of the above operation, the cashless system for the money-exchanging booth 6100 can be realized.

It should be noted that the money-exchanging booth 6100 may also operate as a sales booth for instant lottery tickets 6000. For improved security, however, it is preferable for the sales booth having cash to be located separately from the money-exchanging booth. If the sales booth is constructed as a strictly monitored unmanned system, security can be further improved.

Fourth Embodiment

Figure 7:
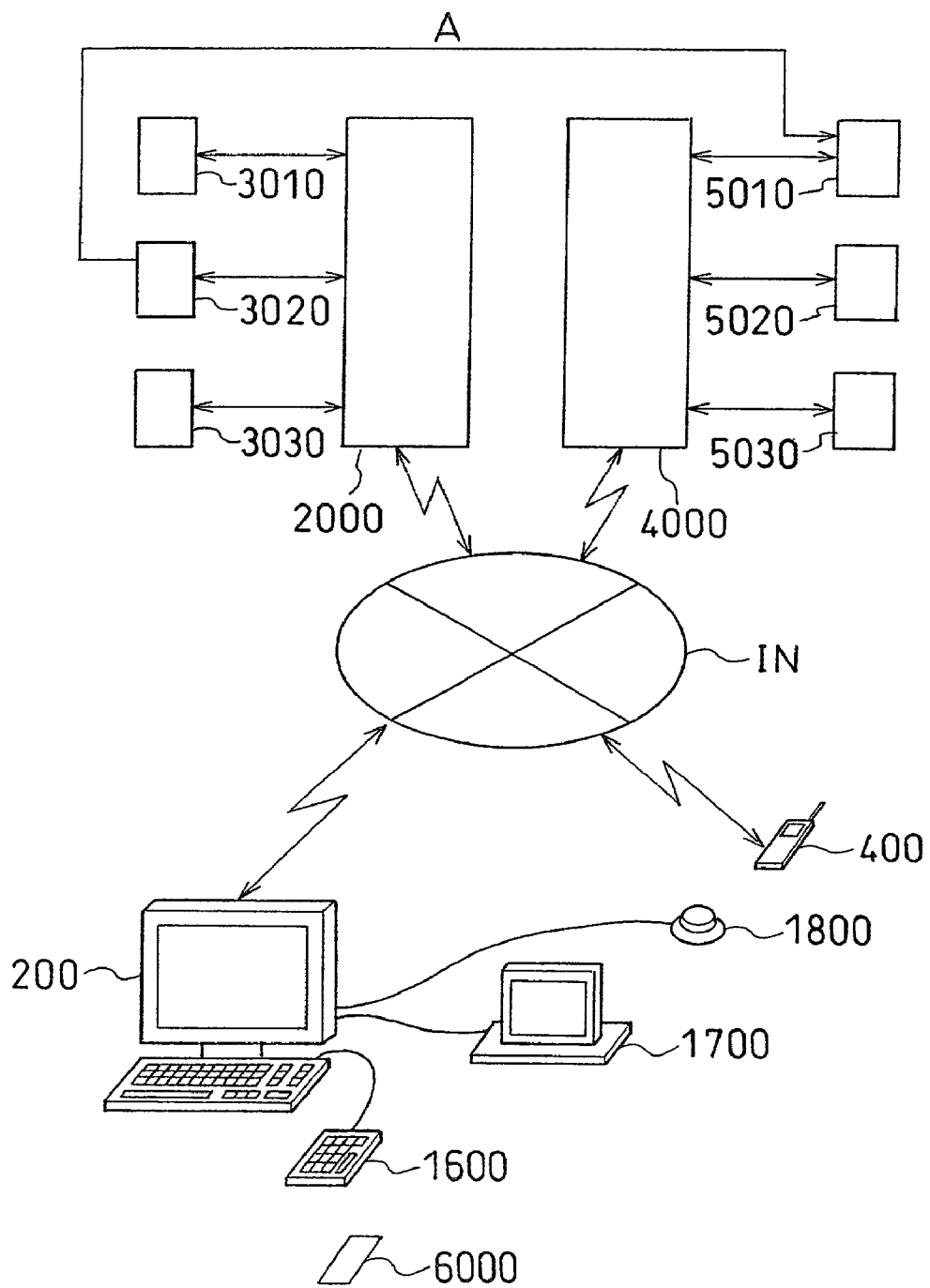
FIG. 7 is a block diagram showing a fourth embodiment of the present invention.

FIG. 7 is a block diagram showing a fourth embodiment of the present invention in which the communication system used in the third embodiment has been modified. In this fourth embodiment, the store communication terminal 200, the customer communication terminal 400, the authentication management apparatus 2000, and the authentication management apparatus 4000 are assumed to be able to communicate with each other via the Internet IN. The construction and functioning of the store communication terminal and the authentication management apparatus are the same as in the third embodiment. By using this construction, the same effects as the third embodiment can be achieved.

Fifth Embodiment

Figure 8:
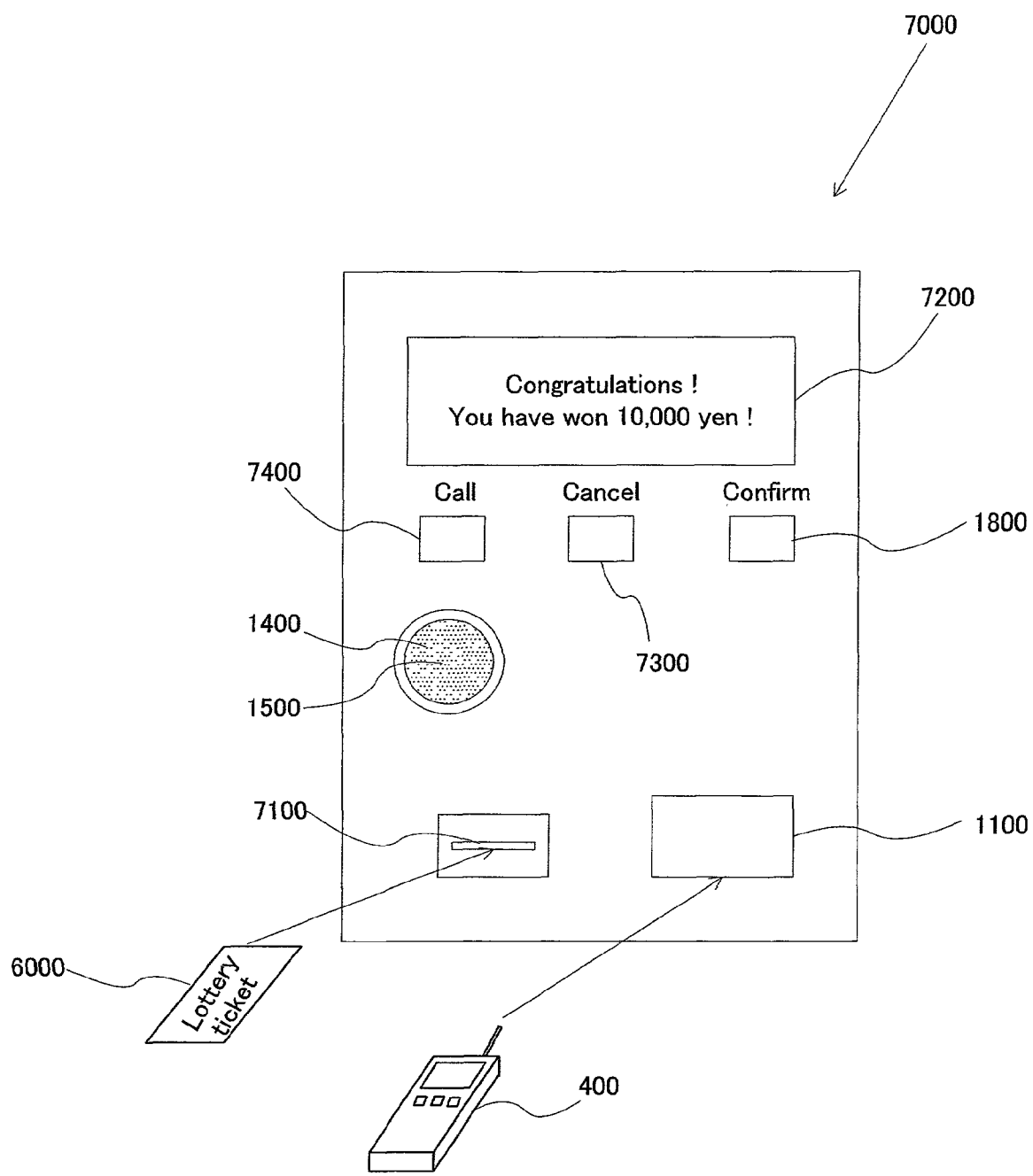
FIG. 8 is a frontal elevation of a fifth embodiment of the present invention.

FIG. 8 shows a fifth embodiment of the present invention that relates to an unmanned money-exchanging booth for an instant lottery. In this embodiment, the construction and functioning of the store communication terminal and the authentication management apparatus are the same as in the third embodiment. An unmanned money-exchanging booth 7000 is in the form of what is normally referred to as a vending machine, and is equipped with a slit 7100 for inserting an instant lottery ticket 6000 and a tunnel 1 100 for inserting a customer communication terminal 400. The unmanned money-exchanging booth 7000 automatically detects whether an instant lottery ticket 6000 in the slit 7100 is a winning ticket and the amount of winnings to be paid, and obtains ID information for the customer communication terminal 400 that has been inserted into the tunnel 1100.

The unmanned money-exchanging booth 7000 is also equipped with a display 7200 and a confirm button 1800. Information showing whether the inserted instant lottery ticket 6000 is a winner and the winnings to be paid is displayed on the display 7200. When the winner 6300 presses the confirm button 1800 at this point, the amount to be paid is fixed.

When the winner 6300 does not agree to the displayed information, the winner 6300 may press a cancel button 7300 to abort the money-exchanging process, or alternatively may press a call button 7400 to communicate with a clerk. To allow the winner 6300 to communicate with a clerk, a speaker 1400 and a microphone 1500 are also provided on the unmanned money-exchanging booth 7000.

It should be noted that in the same way as in the fourth embodiment, the communication between elements like the store communication terminal 200 and the customer communication terminal 400 may be performed via the Internet.

Sixth Embodiment

Figure 9:
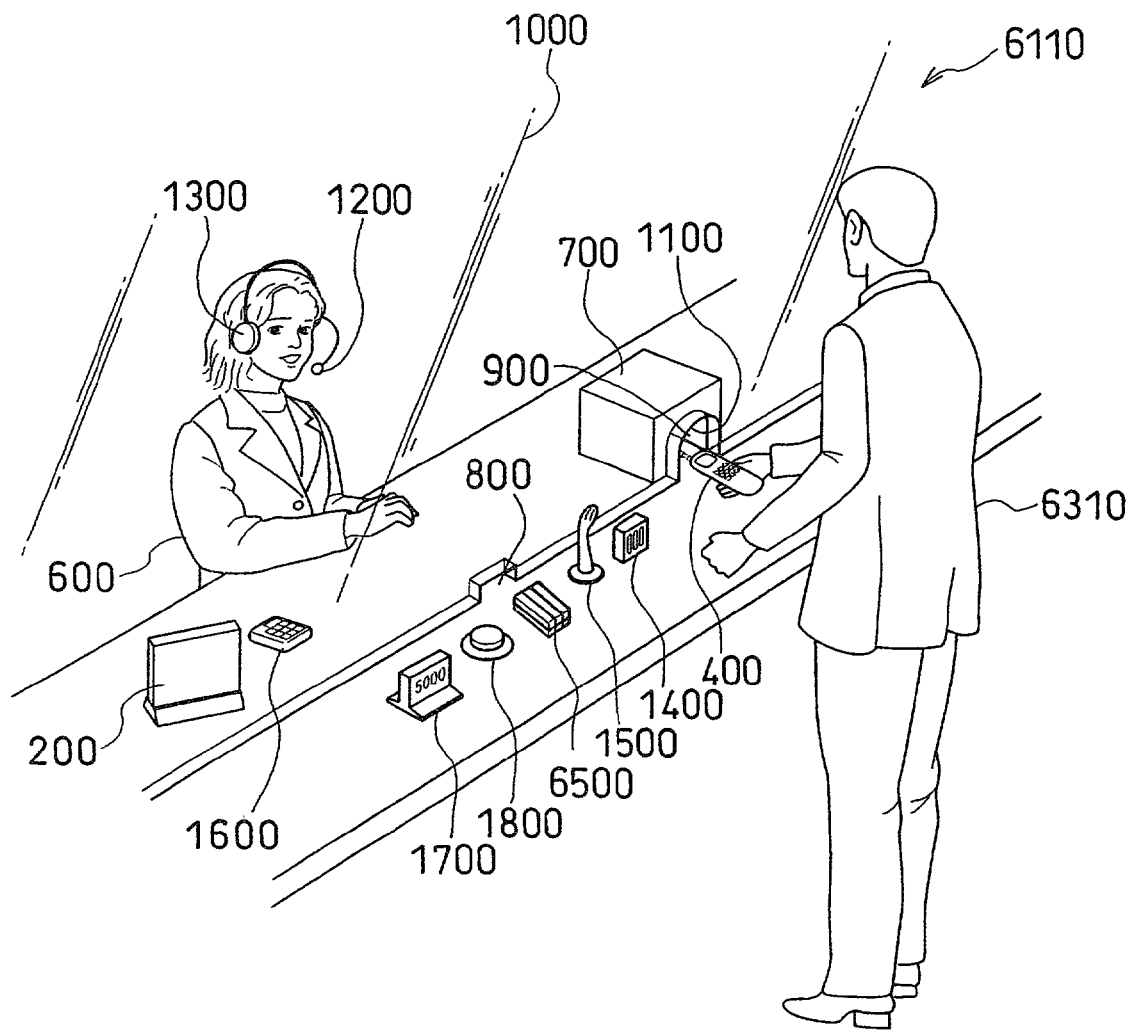
FIG. 9 is a perspective drawing of a sixth embodiment of the present invention.

FIG. 9 is a perspective drawing showing a sixth embodiment of the present invention that relates to a prize-exchanging booth provided at a pachinko parlor.

In this embodiment, a money receiving system includes a store communication terminal 200 owned by a prize-exchanging booth 6110 and a customer communication terminal (mobile communication terminal) 400 owned by a pachinko player 6310. The pachinko player 6310 hands over prizes 6500, which are indicative of the amount won by the pachinko player 6310 through playing pachinko, to the clerk 600 of the prize-exchanging booth 6110, and at the same time inserts his customer communication terminal 400 into the authentication apparatus 700 that is connected to the store communication terminal 200.

The prize-exchanging booth 6110 is provided with as a transparent barrier wall 1000 which has an opening 800 for inserting the prizes 6500 and an opening 900 for inserting the customer communication terminal 400. The opening 800 is so small that only prizes 6500 can pass through. The authentication apparatus 700 has a tunnel 1100 that is connected to the opening 900, and covers the periphery of the opening 900. The clerk 600 is provided with a microphone 1200 and an earphone 1300. On the outside of the transparent barrier wall 1000, a speaker 1400 for outputting sound inputted via the microphone 1200 and a microphone 1500 for inputting the sound outputted by the earphone 1300 are provided. As a result, the transparent barrier wall 1000 can be used to completely seal off the prize-exchanging booth 6110, thereby protecting the security of the prize-exchanging booth 6110.

The authentication apparatus 700 communicates with the customer communication terminal 400 that has been inserted in the tunnel 1100 and obtains ID information for the pachinko player 6310. The customer communication terminal 400 is provided with a storage means (not shown in the drawings), such as a memory, with the ID information being stored in this storage means.

The clerk 600 counts the prizes 6500, and inputs the amount to be paid to the pachinko player 6310 via a ten-key pad 1600. This amount is displayed on a display 1700 provided on the outside of the transparent barrier wall 1000. When the pachinko player 6310 presses a confirm button 1800, this amount is fixed.

In the same way as in the first embodiment, the store communication terminal 200 transmits ID information for the store communication terminal 200, ID information for the pachinko player 6310, and an indication of the amount to be paid to the pachinko player 6310 to an authentication management apparatus 2000 so that a money transfer procedure is performed. As a result, the cashless system for the payment of winnings at the prize-exchanging booth 6110 can be realized. The construction and functioning of the store communication terminal and the authentication management apparatus are the same as in the first embodiment.

It should be noted that the communication between elements like the store communication terminal 200 and the customer communication terminal 400 may be performed via the Internet.

Seventh Embodiment

Figure 10:
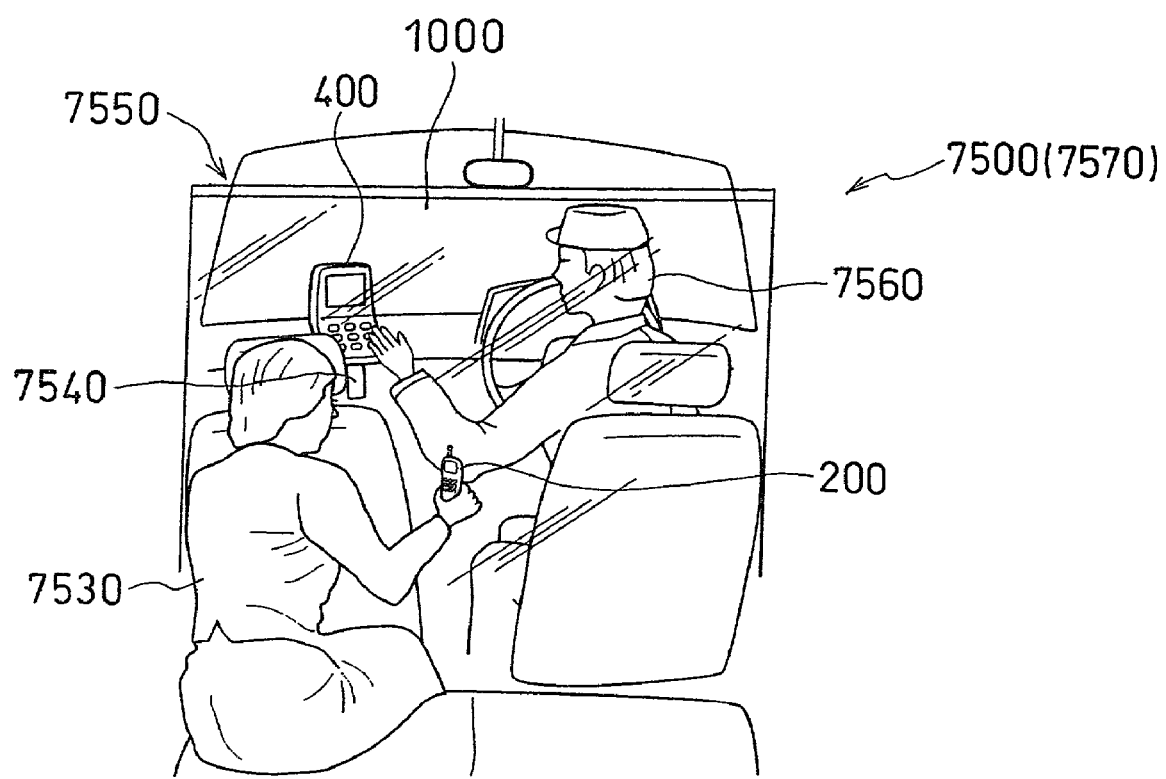
FIG. 10 is a perspective drawing of a seventh embodiment of the present invention.
Figure 11:
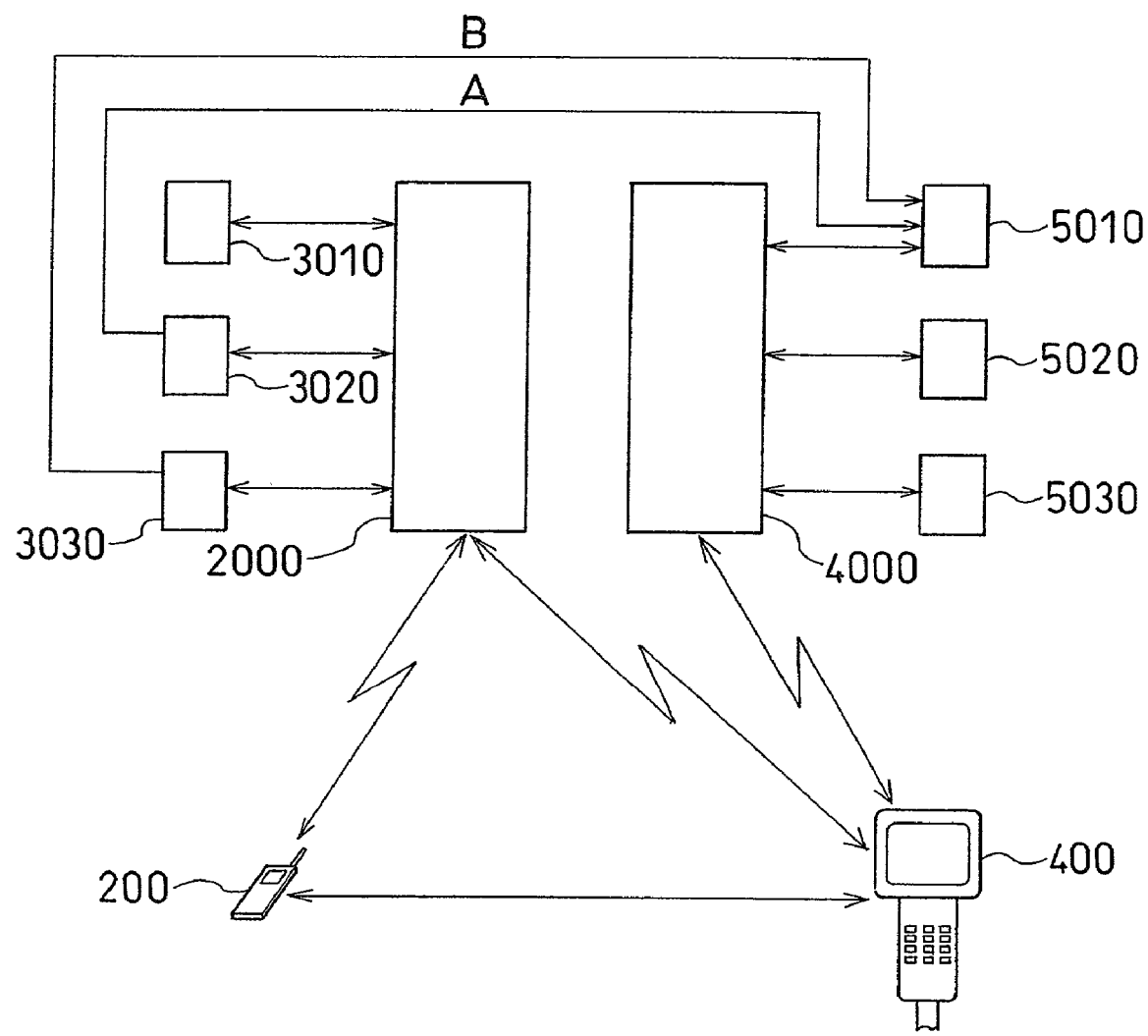
FIG. 11 is a block diagram showing a seventh embodiment of the present invention.
Figure 12:
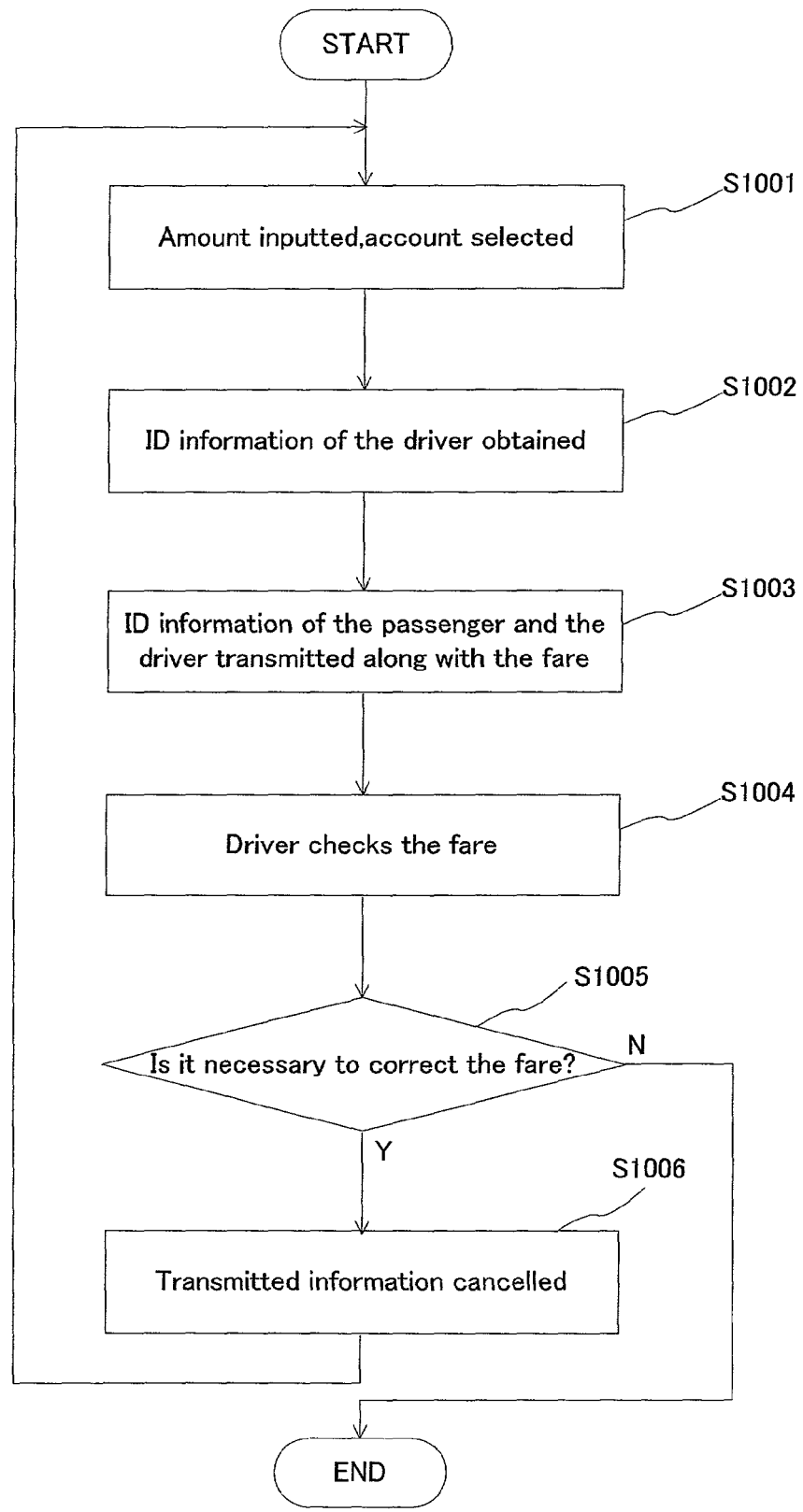
FIG. 12 is a flowchart for the processing performed in the seventh embodiment.

FIG. 10 is a perspective drawing of a seventh embodiment of the present invention that relates to the payment of a taxi fare. FIG. 11 is a block diagram for the present embodiment, and FIG. 12 is a flowchart for the procedure used in the present embodiment.

A taxi 7500 operated by a taxi firm 7570 is equipped with a second mobile communication terminal 400 that has function for operating as a fare meter. The passenger 7530 has a first mobile communication terminal 200. In FIG. 11, the first mobile communication terminal 200 is the passenger 7530's mobile phone, while the second mobile communication terminal 400 is a mobile communication terminal that belongs to the taxi firm 7570 and also serves as a fare meter. Direct communication is performed between the mobile communication terminals 200 and 400 and that the second mobile communication terminal 400 is able to communicate with an authentication management apparatus 2000. With the exception of those, the system is constructed in the same way as in FIG. 1.

When paying a taxi fare, the passenger 7530 operates the first mobile communication terminal 200 so as to input the fare to be paid and to indicate the account from which the fare is to be transferred. This account can be selected as an account for personal taxi use, an account for business-related taxi use, or a different account. The first mobile communication terminal 200 communicates with the second mobile communication terminal 400 so as to obtain ID information for the second mobile communication terminal 400, and then transmits ID information for the first mobile communication terminal 200, the ID information for the second mobile communication terminal 400, and an indication of the fare to the authentication management apparatus 2000. Note that this information may alternatively be transmitted by the second mobile communication terminal 400.

At this point, the second mobile communication terminal 400 communicates with the first mobile communication terminal 200 to confirm the indicated fare and at the same time issues a receipt 7540 or the like. The second mobile communication terminal 400 may make an appropriate record of the transaction. When the fare is incorrect, the driver 7560 uses the second mobile communication terminal 400 to have the operation made by the first mobile communication terminal 200 cancelled.

By using the system described above, the cashless system for the payment of fares in the taxi 7500 can be realized. When the above procedure is used, cash does not need to be directly handed over between the driver 7560 and the passenger 7530, so that a transparent barrier wall 1000 can be provided between the driver's seat and the passenger seats so as to protect the safety of the driver 7560.

It should be noted that the receipt 7540 may be handed to the passenger via a gap 7550 provided between the transparent barrier wall 1000 and the body of the taxi.

In FIG. 12, the passenger 7530 inputs an indication of the taxi fare and an account into the first mobile communication terminal 200 (step S1001). On obtaining ID information from the second mobile communication terminal 400 (step S1002), the first mobile communication terminal 200 transmits ID information for both mobile communication terminals and an indication of the fare to the authentication management apparatus 2000 (step S1003). At this point, the driver 7560 checks the fare using the second mobile communication terminal 400 (step S1004), and judges whether the fare needs to be corrected (step S1005). When this is the case, the second mobile communication terminal 400 communicates with the authentication management apparatus 2000 to cancel the information sent from the first mobile communication terminal 200 (step S1006), and the processing returns to step S1001. Alternatively, when the fare does not need to be corrected, the processing ends at this point.

The store communication terminal (first mobile communication terminal) 200 is equipped with a storage means, a reception means, an input means, and a transmission means (so that its construction is the same as before), and these elements have the same functions as in the first embodiment. The construction and the functions of the authentication management apparatus are also the same as in the first embodiment.

Eighth Embodiment

Figure 13:
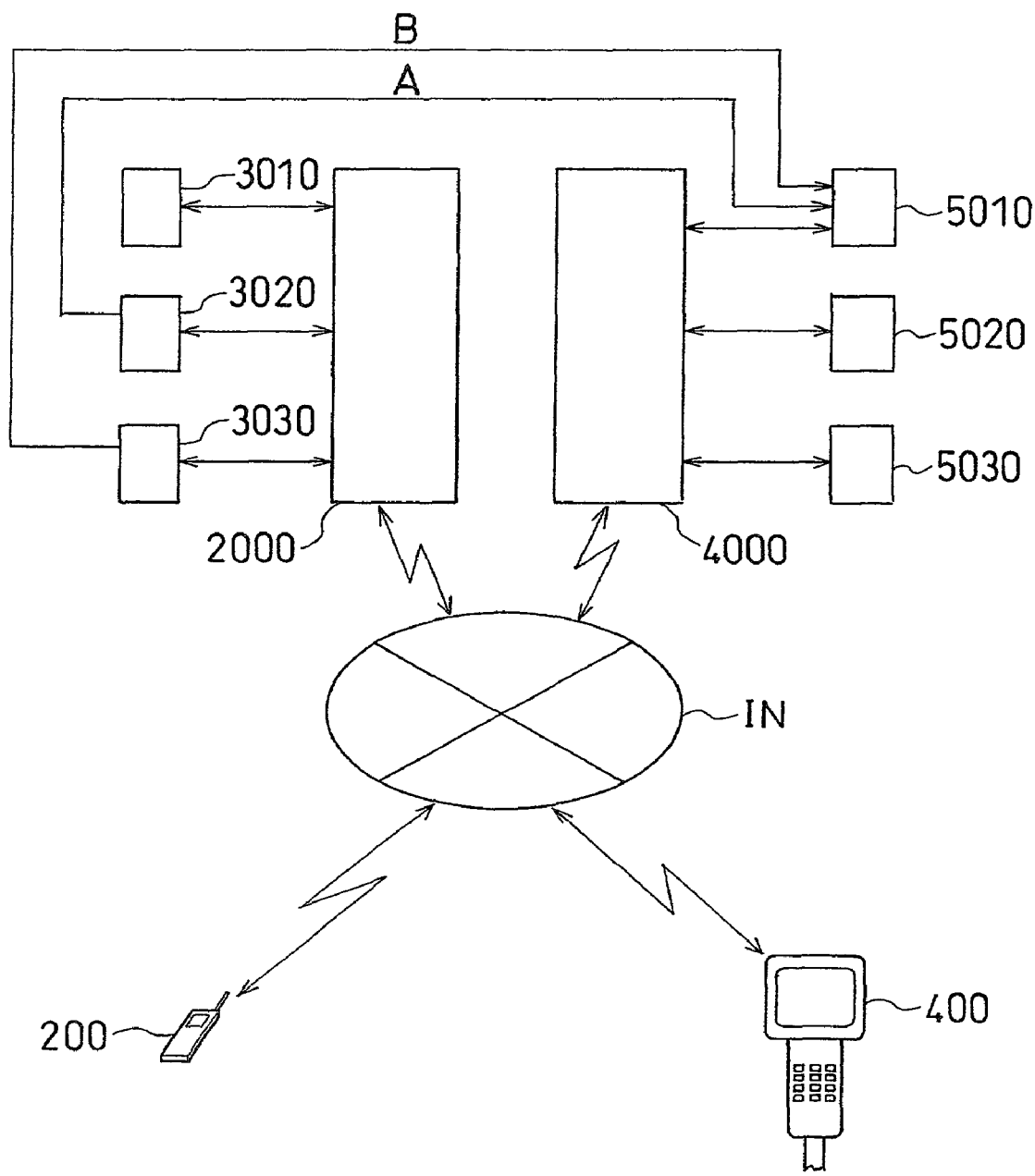
FIG. 13 is a block diagram showing an eighth embodiment of the present invention.

FIG. 13 is a block diagram showing an eighth embodiment of the present invention in which the communication system used in the seventh embodiment has been modified. In this eighth embodiment, the first communication terminal 200, the second communication terminal 400, the authentication management apparatus 2000, and the authentication management apparatus 4000 are assumed to be able to communicate with each other via the Internet IN. The construction and functioning of the store communication terminal (the first mobile communication terminal) and the authentication management apparatus are the same as in the seventh embodiment. By using this construction, the same effects as the seventh embodiment can be achieved.

Ninth Embodiment

Figure 14:
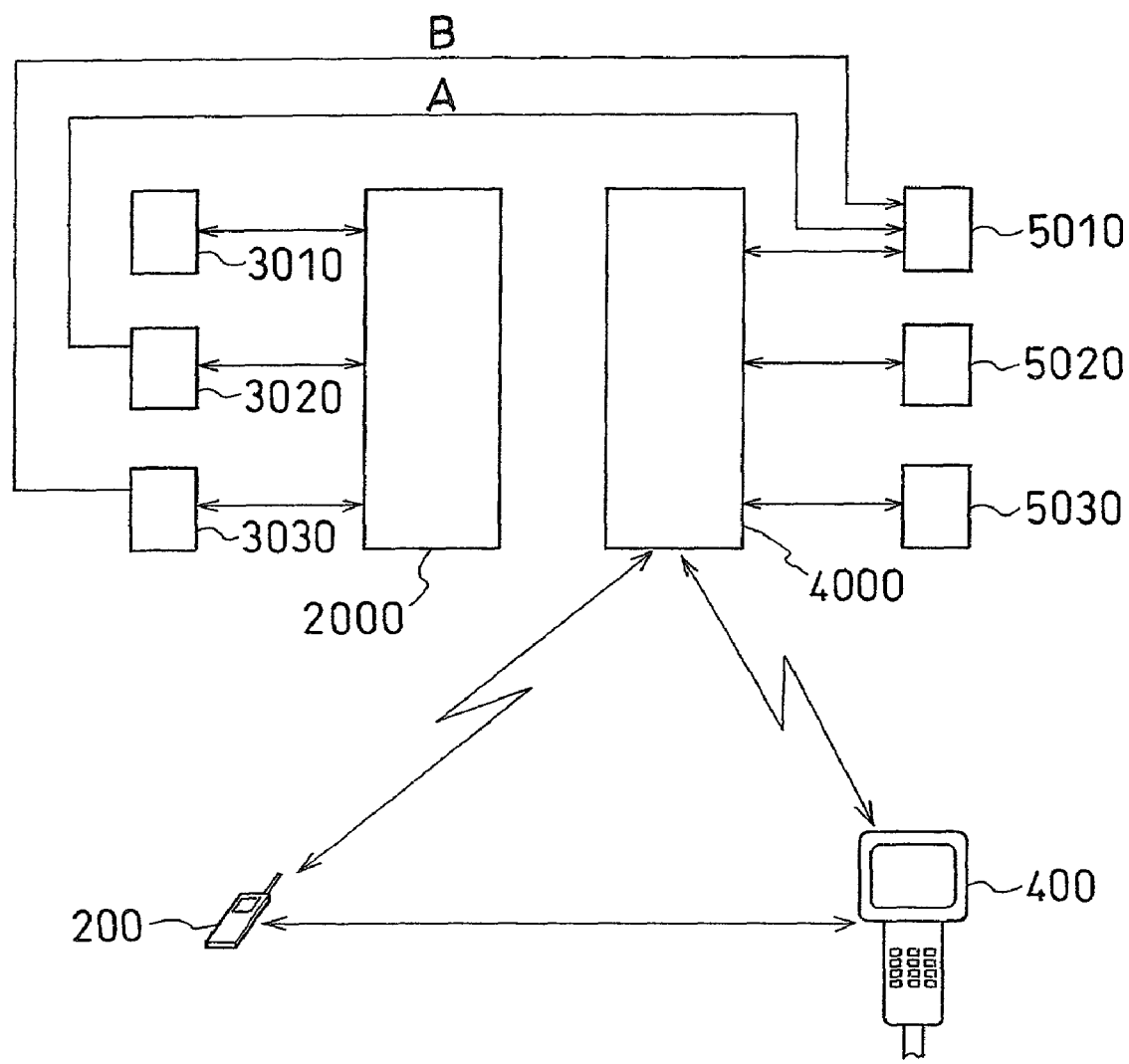
FIG. 14 is a block diagram showing a ninth embodiment of the present invention.

FIG. 14 is a block diagram for a ninth embodiment of the present invention that relates to the payment of a taxi fare. In place of the authentication manager in the seventh embodiment, the taxi firm 7570 acts as the authentication manager (with the authentication management apparatus being shown as element 4000).

A taxi ticket system is conventionally available as one way of paying taxi fares. Passengers who use this system have a deposit that can be managed by a taxi firm.

As a result, a passenger who uses the taxi ticket system transmits ID information and an indication of the fare directly from the first mobile communication terminal 200 to the taxi firm 7570, with the taxi firm 7570 receiving the transfer of a payment from the passenger account through processing that is based on a contract between the passenger and the taxi firm.

Tenth Embodiment

Figure 15:
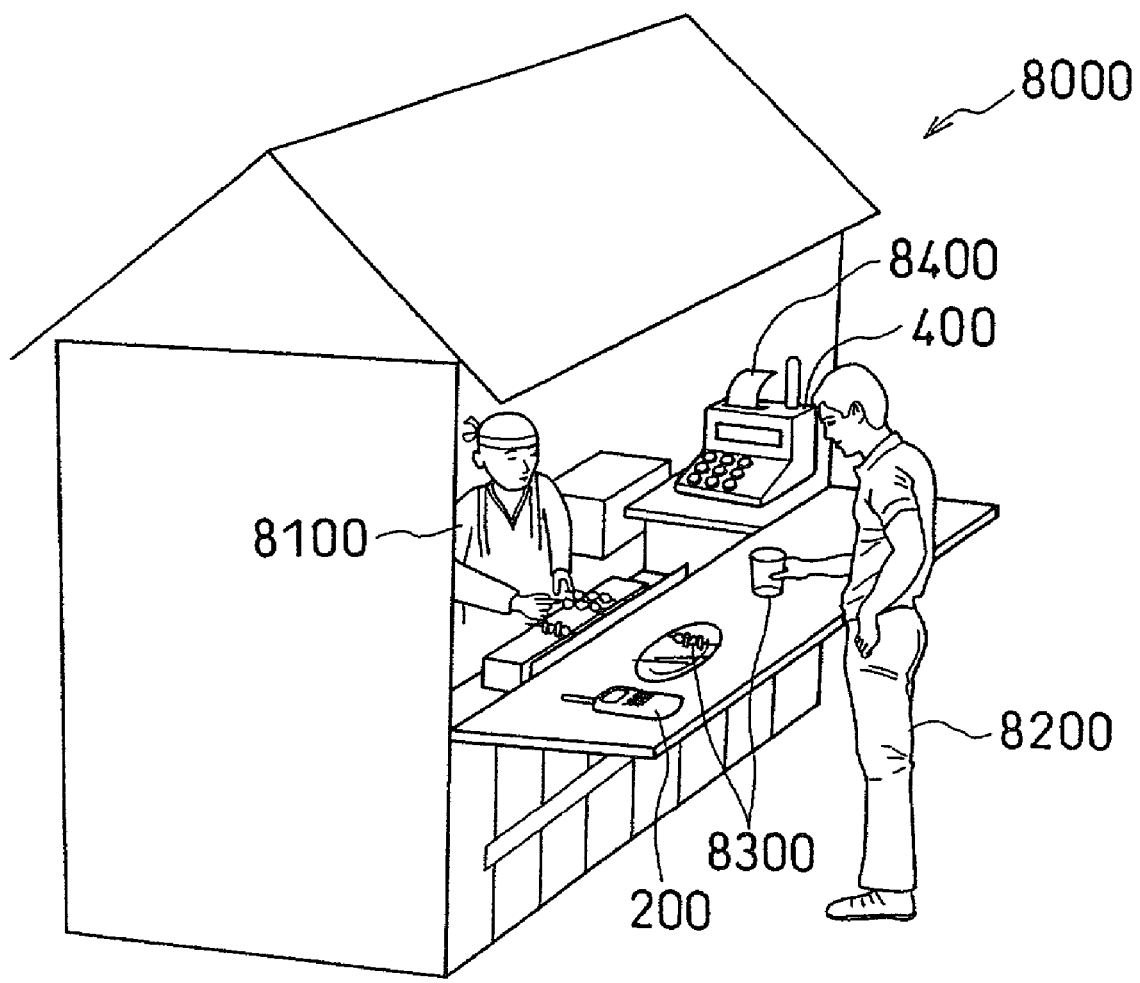
FIG. 15 is a perspective drawing showing a processing used in a tenth embodiment of the present invention.
Figure 16:
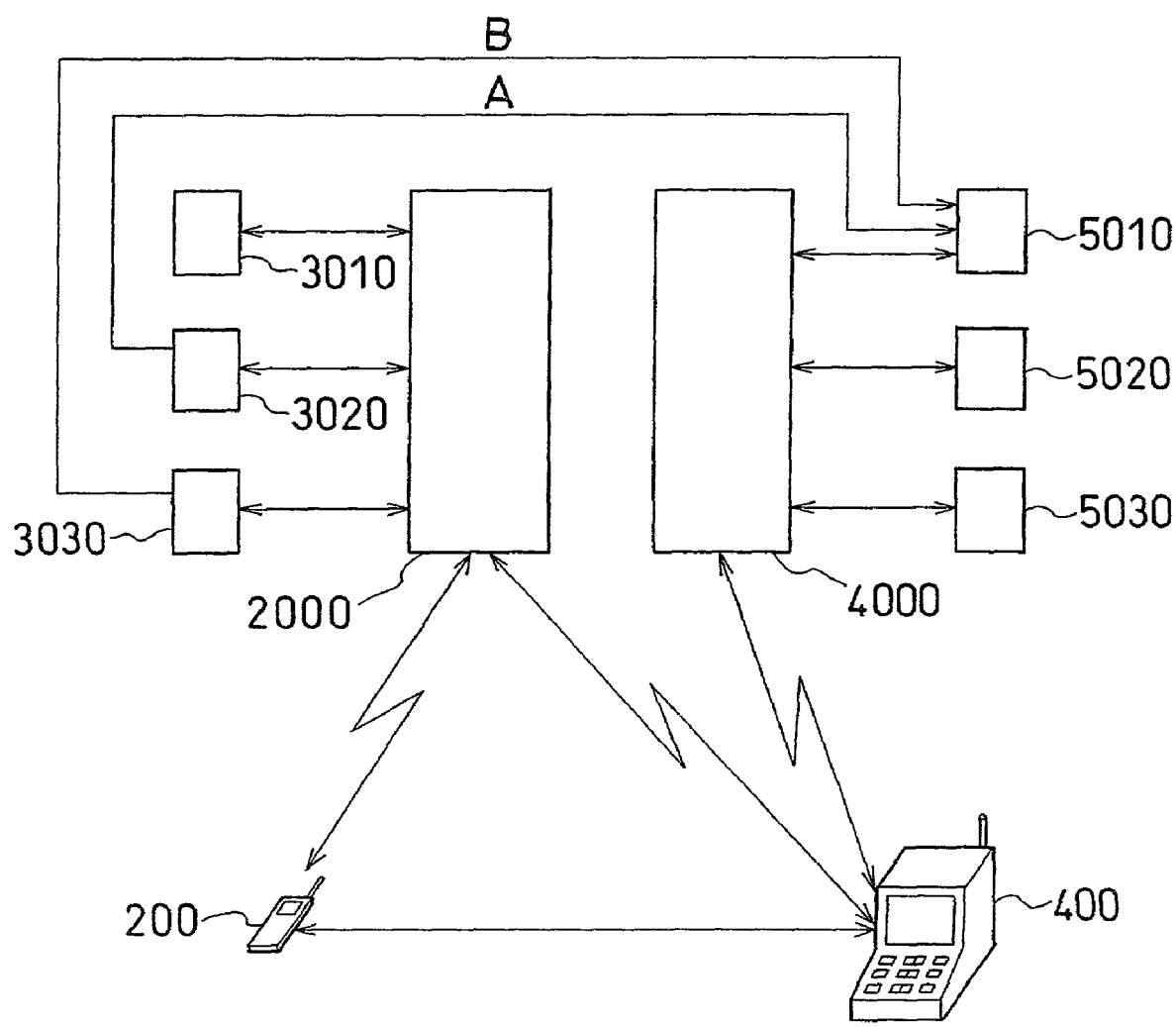
FIG. 16 is a block diagram showing the tenth embodiment.
Figure 17:
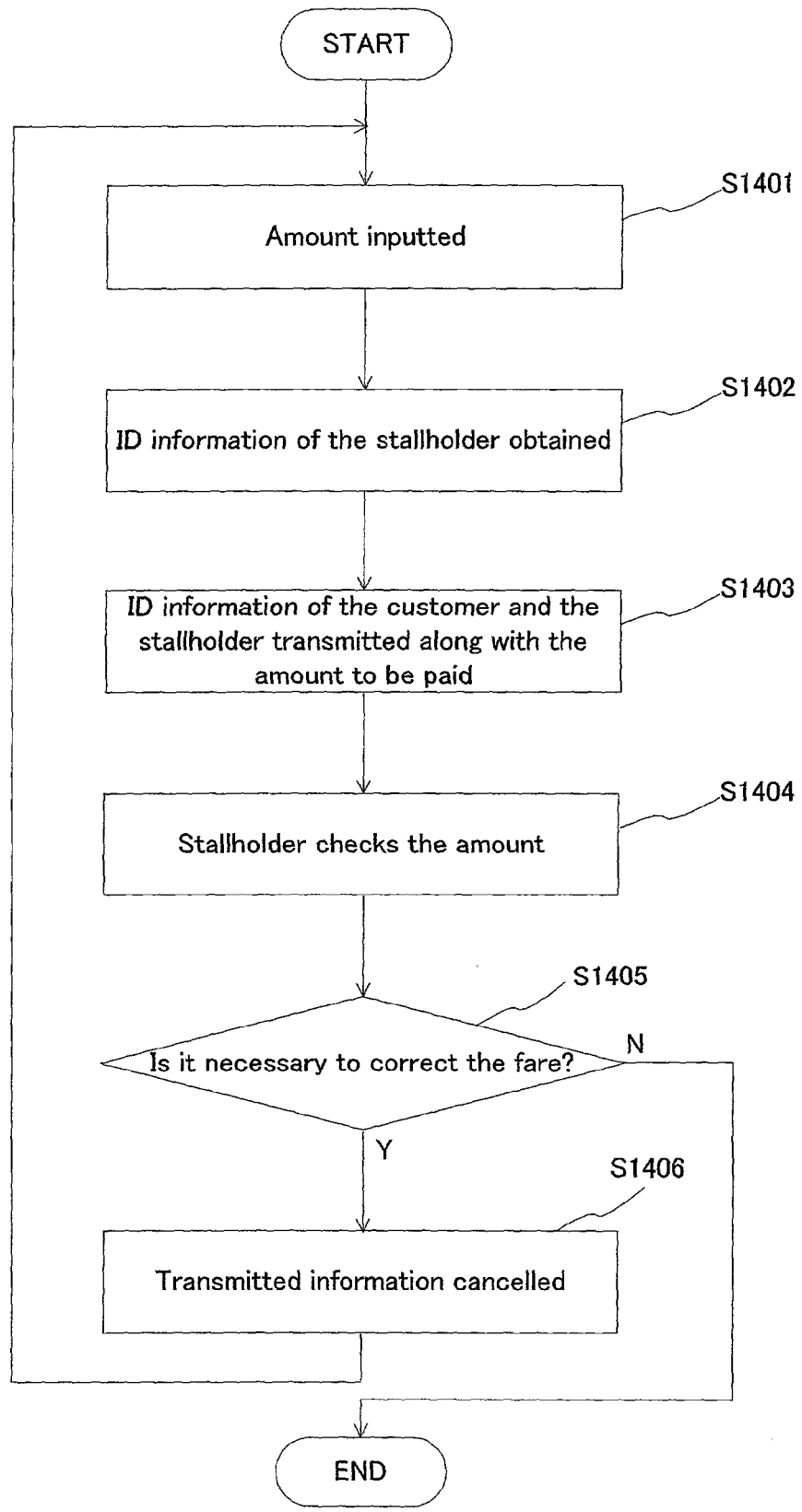
FIG. 17 is a flowchart for the processing performed in the tenth embodiment.

FIG. 15 is a perspective drawing of the tenth embodiment that relates to a food stall. FIG. 16 is a block diagram for this embodiment and FIG. 17 is a flowchart showing the processing performed. A stallholder 8100 of a food stall 8000 has a second mobile communication terminal 400 that has a function of cash register. A customer 8200 has a first mobile communication terminal 200. In FIG. 16, the first mobile communication terminal 200 is the customer 8200's mobile phone, while the second mobile communication terminal 400 is a mobile communication terminal of the food stall 8000 that also serves as a cash register. The mobile communication terminals 200 and 400 communicate with each other and the second mobile communication terminal 400 is able to communicate with the authentication management apparatus 2000. With the exceptions of those, the construction is the same as that shown in FIG. 1.

When paying the bill for food and drinks 8300, the customer 8200 operates the first mobile communication terminal 200 so as to communicate with the second mobile communication terminal 400 to obtain ID information for the second mobile communication terminal 400. The customer 8300 also indicates the billed amount using the first mobile communication terminal 200. The first mobile communication terminal 200 then transmits ID information for the first mobile communication terminal 200, the ID information for the second mobile communication terminal 400, and an indication of the billed amount to the authentication management apparatus 2000. Note that this information may be alternatively transmitted by the second mobile communication terminal 400.

At this point, the second mobile communication terminal 400 communicates with the first mobile communication terminal 200 to issue a receipt 8400 or the like for the indicated amount, and also makes an appropriate record of the transaction. The stallholder 8100 is able to check whether the correct amount has been indicated from this receipt 8400.

When the amount is incorrect, the stallholder 8100 can use the second mobile communication terminal 400 to cancel the operation made by the first mobile communication terminal 200.

By performing the above process, the cashless system for the payment of the bill at a food stall 8000 can be realized.

In FIG. 17, the customer 8200 inputs the billed amount into the first mobile communication terminal 200 (step S1401). The first mobile communication terminal 200 then obtains ID information for the stallholder 8100 from the second mobile communication terminal 400 (step S1402). On doing so, the first mobile communication terminal 200 transmits the ID information of both mobile communication terminals and an indication of the billed amount to the authentication management apparatus 2000 (step S1403). At this point, the stallholder 8100 confirms the amount inputted by the customer 8200 using the second mobile communication terminal 400 (step S1404), and judges whether the amount needs to be corrected (step S1405). When the amount needs to be corrected, the second mobile communication terminal 400 communicates with the authentication management apparatus 2000 to cancel the information sent from the first mobile communication terminal 200 (step S1406), and the processing returns to step S1401. Alternatively, when the amount does not need to be corrected, the processing ends at this point.

Eleventh Embodiment

Figure 18:
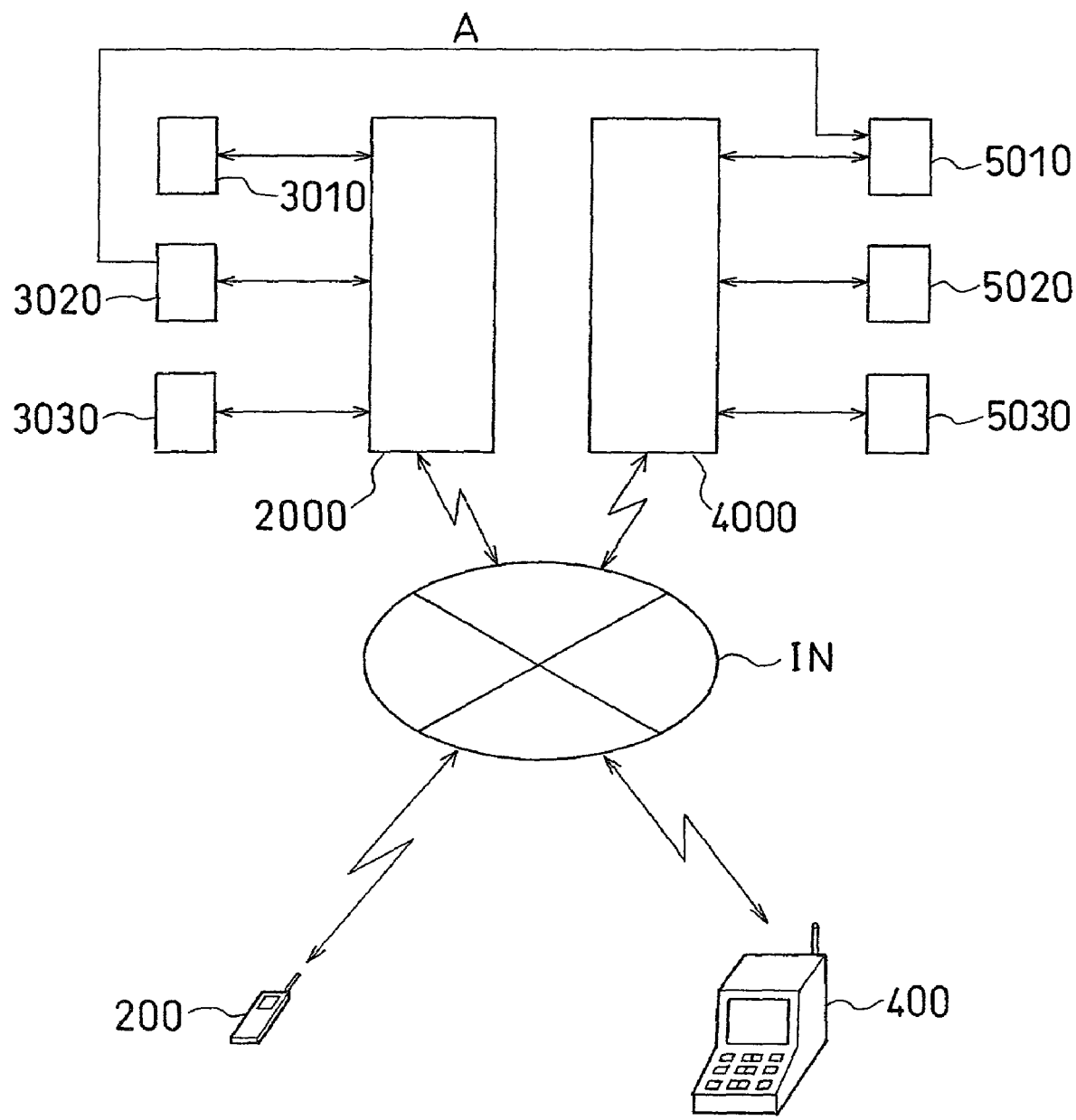
FIG. 18 is a block diagram showing an eleventh embodiment of the present invention.

FIG. 18 is a block diagram showing an eleventh embodiment of the present invention in which the communication system used in the tenth embodiment has been modified. In this eleventh embodiment, the first communication terminal 200, the second communication terminal 400, the authentication management apparatus 2000, and the authentication management apparatus 4000 are assumed to be able to communicate with each other via the Internet IN. By using this construction, the same effects as the tenth embodiment can be achieved.

Twelfth Embodiment

Figure 19:
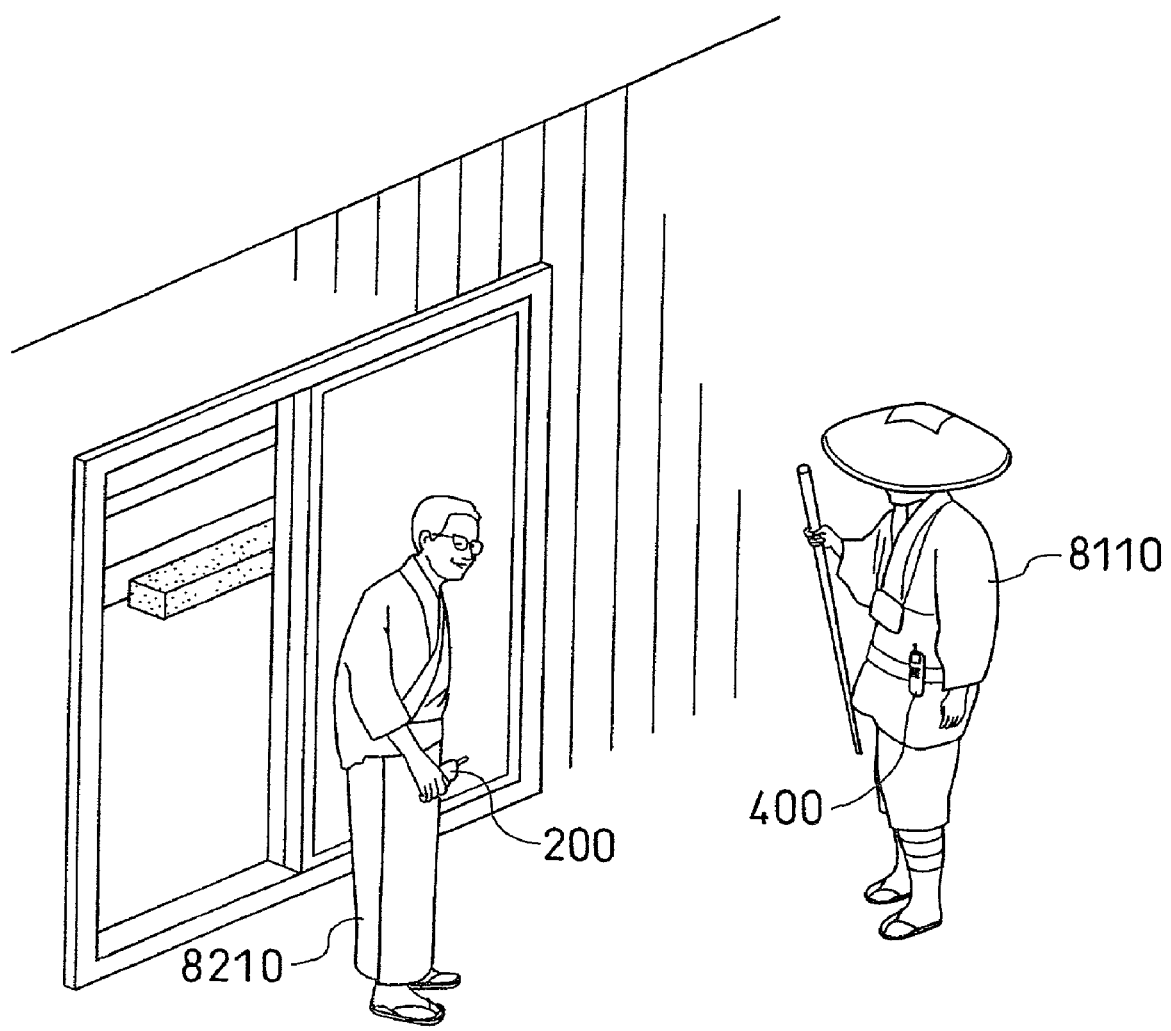
FIG. 19 is a perspective drawing of a twelfth embodiment of the present invention.

FIG. 19 shows a twelfth embodiment of the present invention that relates to offerings made at a temple. In this example, a priest 8110 who is to receive the offering has a second mobile communication terminal 400 while the giver 8210 of the offering has a first mobile communication terminal 200.

When making an offering, the giver 8210 operates the first mobile communication terminal 200 so that the first mobile communication terminal 200 communicates with the second mobile communication terminal 400 and obtains ID information for the second mobile communication terminal 400. The giver 8210 indicates a monetary amount to be given as the offering using the first mobile communication terminal 200, and the first mobile communication terminal 200 sends information showing the indicated amount and ID information for the first mobile communication terminal 200 and the second mobile communication terminal 400 to the authentication management apparatus 2000.

Thirteenth Embodiment

Figure 20:
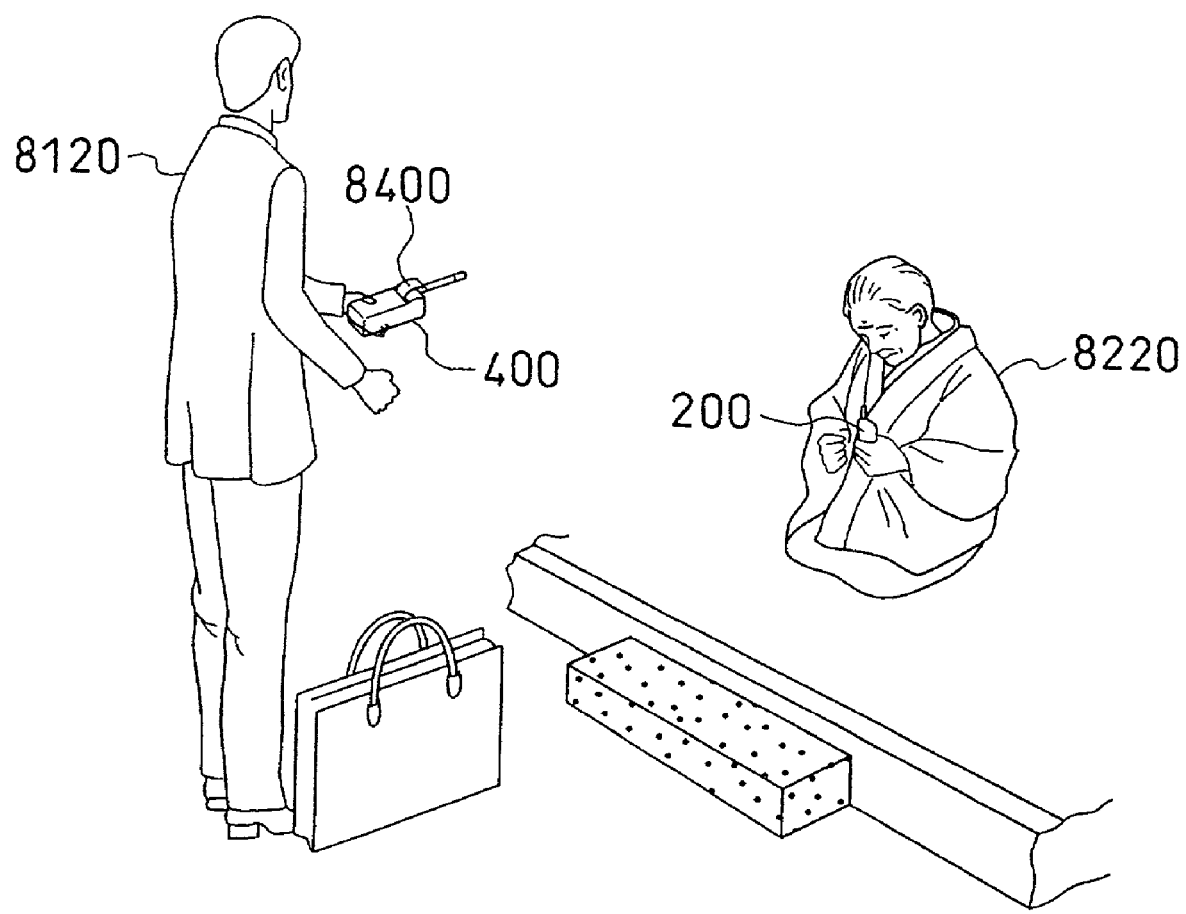
FIG. 20 is a perspective drawing of a thirteenth embodiment of the present invention.

FIG. 20 is a thirteenth embodiment of the present invention that relates to bill collection. A collector 8120 has a second mobile communication terminal 400 while a customer 8220 has a first mobile communication terminal 200. While direct debits are widely used for the payment of utility charges and the like, there are still many customers who dislike such automatic processes and retailers (such as a newspaper vendors) who prefer to collect payments from customers. The thirteenth embodiment of the present invention enables such bills to be paid without using cash.

When paying a bill, the customer 8220 operates the first mobile communication terminal 200 so that the first mobile communication terminal 200 communicates with the second mobile communication terminal 400 and obtains ID information for the second mobile communication terminal 400. The customer 8220 indicates the amount to be paid using the first mobile communication terminal 200, and the first mobile communication terminal 200 sends information showing the indicated amount and ID information for the first mobile communication terminal 200 and the second mobile communication terminal 400 to the authentication management apparatus 2000.

At this point, the second mobile communication terminal 400 communicates with the first mobile communication terminal 200 and issues a receipt 8400 or the like for the indicated amount, as well as making a record of the collected amount. The collector 8120 can confirm whether the customer 8220 has inputted the correct amount from the receipt.

When the amount is incorrect, the second mobile communication terminal 400 can cancel the operation made by the first mobile communication terminal 200.

In each of the ninth to thirteenth embodiments, the construction and the functioning of the store communication terminal (first mobile communication terminal) and the authentication management apparatus are the same as in the first embodiment.

INDUSTRIAL APPLICABILITY

The present invention provides a money receiving system that realizes a cashless system for monetary payments without placing restrictions on the recipients of such payments, as well as an authentication management apparatus and a store communication terminal that are used in this money receiving system.

The invention claimed is:
1. A store communication terminal, comprising:
a memory configured to store transfer source store account information and store ID information;
a receiver configured to receive customer ID information from a memory of a customer mobile communication device;

an input device configured to input monetary amount information that a store is to pay a customer; and a transmitter configured to transmit at least one of the store ID information, the transfer source store account information, the customer ID information and the monetary amount information to the customer mobile communication device for authentication, wherein the receiver is configured to receive at least one of authenticated store ID information, authenticated transfer source store account information, authenticated customer ID information and authenticated monetary amount information from the customer mobile communication device and if the authentication using the customer mobile communication device is successful the transmitter is configured to transmit at least one of the store ID information, the transfer source store account information, the customer ID information and the monetary amount information to an authentication manager that further authenticates the at least one of the store ID information, the transfer source store account information, the customer ID information and the monetary amount information, wherein the authentication manager communicates with a first financial institution based on the store ID information and retrieves information of a store account and communicates with a second financial institution based on the customer ID information and retrieves information on a customer ID account, and wherein, upon successful authentication using the authentication manager, a monetary amount based on the monetary amount information is transferred from the store account of the first financial institution to the customer account of the second financial institution.

2. The store communication terminal in accordance with claim 1, wherein the input device is further configured to input the transfer source store account information.

3. The store communication terminal in accordance with claim 1, wherein the store communication terminal is a mobile communication terminal.

4. The store communication terminal in accordance with claim 1, wherein the store communication terminal comprises a pawnshop communication terminal.

5. The store communication terminal in accordance with claim 1, wherein the store communication terminal comprises a lottery money-exchanging device.

6. The store communication terminal in accordance with claim 1, wherein the store communication terminal comprises a prize-exchanging booth of a pachinko device.

7. The store communication terminal in accordance with claim 2, wherein the store communication terminal is a mobile communication terminal.

8. The store communication terminal in accordance with claim 2, wherein the store communication terminal comprises a pawnshop communication terminal.

9. The store communication terminal in accordance with claim 2, wherein the store communication terminal comprises a lottery money-exchanging device.

10. The store communication terminal in accordance with claim 2, wherein the store communication terminal comprises a prize-exchanging booth of a pachinko device.

11. A method, comprising:
receiving, using a processing device of a store communication terminal, customer ID information from a memory of a customer mobile communication device;
receiving, using the processing device of the store communication terminal, at least one of a monetary amount information that a store is to pay a customer and a transfer store account information from an input device;
transmitting, using the processing device, a store ID information, the transfer source store account information, the customer ID information, and the monetary amount information to the customer mobile communication device that is configured to authenticate at least one of the store ID information, the transfer source store account information, the customer ID information, and the monetary amount information;
if the authentication using the customer mobile communication device is successful, transmitting, using the processing device, the store ID information, the transfer source store account information, the customer ID information, and the monetary amount information from the store communication terminal to an authentication manager that includes first and second authenticators;
authenticating, using a processing device of the first authenticator, the store ID information and the customer ID information, and
if authentication is successful, obtaining, using the first authenticator, information for a store account from a first financial institution;
authenticating, using a processing device of the second authenticator, the customer ID information, and
if authentication is successful, obtaining, using the second authenticator, information for a customer account from a second financial institution; and
transferring a monetary amount based on the monetary amount information from the store account indicated by the first financial institution to the customer account indicated by the second financial institution.

12. A tangible computer-readable medium having stored thereon computer-executable instructions, execution of which by a computing device cause the computing device to:
receive, on a store communication terminal, customer ID information from a memory of a customer mobile communication device;
receive, on the store communication terminal, at least one of monetary amount information that a store is to pay a customer and transfer store account information from an input device;
transmit a store ID information, the transfer source store account information, the customer ID information, and the monetary amount information to the customer mobile communication device that is configured to authenticate at least one of the store ID information, the transfer source store account information, the customer ID information, and the monetary amount information;
transmit the store ID information, the transfer source store account information, the customer ID information, and the monetary amount information from the store communication terminal to an authentication manager that includes a first and second authenticators;
authenticate, using the first authenticator, the store ID information and the customer ID information and, if authentication is successful, obtain using the first authenticator information for a store account from a first financial institution;
authenticate, using the second authenticator, the customer ID information and, if authentication is successful, obtain using the second authenticator information for a customer account from a second financial institution; and
transfer a monetary amount based on the monetary amount information from the store account indicated by the first financial institution to the customer account indicated by the second financial institution.

13. The store communication terminal in accordance with claim 1, wherein the store communication terminal, the customer mobile communication device, and the authentication management apparatus communicate with each other through an Internet network.

14. A system comprising:
- a store communication terminal configured to store transfer source store account information and store ID information and receive customer ID information from a memory of a customer mobile communication device;
- an input device connected to the store communication terminal and configured to input monetary amount information that a store is to pay a customer;
- a transmitter located on the store communication terminal configured to transmit at least one of the store ID information, the transfer source store account information, the customer ID information and the monetary amount information to the customer mobile communication device for authentication and, if the customer mobile communication device authentication is successful, transmit at least one of the store ID information, the transfer source store account information, the customer ID information and the monetary amount information to an authentication manager that includes a first and second authenticators;
- the first authenticator configured to authenticate the customer ID information and the store ID information and, if authentication is successful, communicate the customer ID information to the second authenticator and obtain an authenticated store account information from a first financial institution; and
- the second authenticator configured to authenticate the customer ID information, and if authentication is successful, obtain an authenticated customer account information from a second financial institution, wherein a monetary amount based on the monetary amount information is transferred from the authenticated store account of the first financial institution to the authenticated customer account of the second financial institution.

15. The system in accordance with claim 14, wherein the authentication manager is configured to stop the transfer device from transferring the money in response to receiving cancel information from the store communication terminal.

* * * * *

UNITED STATES PATENT AND TRADEMARK OFFICE
CERTIFICATE OF CORRECTION

| | | |
|---|---|---|
| PATENT NO. | : 8,032,460 B2 | Page 1 of 1 |
| APPLICATION NO. | : 10/089122 | |
| DATED | : October 4, 2011 | |
| INVENTOR(S) | : Takatori et al. | |

It is certified that error appears in the above-identified patent and that said Letters Patent is hereby corrected as shown below:

Title page, item (54), and Column 1, lines 1-3, "Title", delete "AUTHENTICATION MANAGING APPARATUS, AND SHOP COMMUNICATION TERMINAL" and insert -- AUTHENTICATION MANAGEMENT APPARATUS AND STORE COMMUNICATION TERMINAL --.

Title Page 2, item (56), under "Other Publications", in Column 2, Line 2, delete "Appliation" and insert -- Application --.

Signed and Sealed this
Tenth Day of July, 2012

David J. Kappos
*Director of the United States Patent and Trademark Office*